(12) United States Patent
Iwazumi et al.

(10) Patent No.: US 8,642,180 B2
(45) Date of Patent: Feb. 4, 2014

(54) ANTI-FOG POLYURETHANE COATING COMPOSITIONS

(75) Inventors: Masanori Iwazumi, Irvine, CA (US); Walter S. Creasy, Bridgewater, NJ (US); Robert G. LaCasse, Flemington, NJ (US)

(73) Assignee: SDC Technologies, Inc., Irvine, CA (US)

( * ) Notice: Subject to any disclaimer, the term of this patent is extended or adjusted under 35 U.S.C. 154(b) by 104 days.

(21) Appl. No.: 13/445,971

(22) Filed: Apr. 13, 2012

(65) Prior Publication Data

US 2012/0308828 A1 Dec. 6, 2012

Related U.S. Application Data

(60) Provisional application No. 61/491,597, filed on May 31, 2011.

(51) Int. Cl.
| | | |
|---|---|---|
| B32B 27/40 | (2006.01) | |
| B32B 27/32 | (2006.01) | |
| B32B 27/36 | (2006.01) | |
| C08K 5/5465 | (2006.01) | |
| B05D 3/00 | (2006.01) | |

(52) U.S. Cl.
USPC .......... 428/423.1; 428/423.3; 428/423.7; 428/424.6; 428/424.8; 428/425.6; 427/385.5; 524/501; 524/105

(58) Field of Classification Search
USPC .......... 428/423.3, 423.7, 424.6, 424.8, 425.6, 428/423.1; 427/385.5; 524/104, 501
See application file for complete search history.

(56) References Cited

U.S. PATENT DOCUMENTS

| | | |
|---|---|---|
| 3,935,146 A | 1/1976 | Noll et al. |
| 4,143,181 A | 3/1979 | Cahn et al. |
| 5,262,475 A | 11/1993 | Creasy |
| 5,316,791 A | 5/1994 | Farber et al. |
| 5,798,409 A | 8/1998 | Ho |
| 5,877,254 A | 3/1999 | La Casse et al. |
| 6,569,533 B1 | 5/2003 | Uchida et al. |
| 6,780,516 B2 | 8/2004 | Chen |
| 6,897,281 B2 | 5/2005 | Lubnin et al. |
| 7,097,704 B1 | 8/2006 | Pae |
| 2005/0182154 A1* | 8/2005 | Berge et al. ............. 523/160 |
| 2006/0014099 A1 | 1/2006 | Faler et al. |
| 2009/0081292 A1 | 3/2009 | Otomo et al. |
| 2010/0130701 A1 | 5/2010 | Lahdensuo |
| 2010/0256283 A1 | 10/2010 | Kagata et al. |

OTHER PUBLICATIONS

Surfactants Types and Uses, Laboratory of Formulation, Interfaces Rheology and Processes, FIRP Booklet #E300-A, Universidad de Los Andes, Merida-Venezuela, Version #2, 2002.
Formulating Polyurethane Dispersions, Werner J. Blank, King Industries Inc., Norwalk, CT, accessed via the internet at wernerblank.com on Apr. 9, 2010.
Urethane-Acrylic Hybrid Polymers: Performance as 1K Coatings, Ernest C. Galgoci et al., Air Products and Chemicals, Inc., presented at The Society of the Plastics Industry/Epoxy Resin Formulators Division Spring Conference in Toronto, Canada, Apr. 1-3, 2001.
International Search Report for International Application No. PCT/US2012/033414, dated Jul. 9, 2012.
Written Opinion for International Application No. PCT/US2012/033414, dated Jul. 9, 2012.

* cited by examiner

*Primary Examiner* — Thao T. Tran
(74) *Attorney, Agent, or Firm* — Calfee, Halter & Griswold LLP

(57) ABSTRACT

Polyurethane coating compositions that provide transparent, abrasion-resistant, and water-washable anti-fog coatings when applied to a substrate and cured are described herein. These polyurethane coating compositions have surfactants that are chemically associated with the polyurethane so as to not leach out or wash away when the coating surface is soaked or washed with water. The polyurethane coating compositions comprise isocyanate-reactive surfactants, isocyanate-reactive salts of surfactants, carboxylic-reactive surfactants, or combinations thereof that are chemically bonded to the polyurethane. Articles coated with such polyurethane coating compositions, and processes for applying the coating compositions to a substrate, are also provided herein.

25 Claims, No Drawings

ANTI-FOG POLYURETHANE COATING COMPOSITIONS

CROSS-REFERENCE TO RELATED APPLICATION

This application claims priority to and any other benefit of U.S. Provisional Patent Application Ser. No. 61/491,597, filed on May 31, 2011, and entitled "ANTI-FOG POLYURETHANE COATING COMPOSITIONS," the entire disclosure of which is incorporated by reference herein.

FIELD OF THE INVENTION

The present invention relates to anti-fog coating compositions. More particularly, the present invention relates to polyurethane coating compositions that provide transparent, abrasion-resistant, and water-washable anti-fog coatings when applied to a substrate and cured. The present invention also relates to articles coated with such polyurethane coating compositions and processes for applying the coating compositions to a substrate. The anti-fog polyurethane coating compositions are applied directly to the substrate or directly to a primer-coated substrate and cured, or the coating compositions are cast into unsupported films for later attachment to the substrate.

BACKGROUND

Transparent films are being increasingly used as coatings for various glass and plastic articles, such as glass or plastic optical lenses; goggles; face shields; face plates for helmets; automobile windshields; substrates used between temperature differentials, i.e., frozen food display doors; and the like. Organic polymer coatings, such as polyurethanes, are particularly useful in providing self-supporting surfaces or coatings for such applications, in that these transparent materials can provide high strength and improved abrasion resistance to the surface. However, such polyurethane coatings have a high susceptibility to fogging (also referred to as frosting under certain conditions) on their surfaces, which wiping of the surface cannot always adequately remedy.

Fog appears when moisture condenses on a hydrophobic surface and is drawn into tiny droplets that scatter light. The scattering of the light gives the surface the appearance of a fog. Hydrophilic surfaces, on the other hand, will absorb the condensed moisture into the surface preventing the tiny light scattering droplets from forming. However, at some point the hydrophilic surface may reach saturation of the moisture, thus resulting in the formation of light scattering water droplets on the surface and resulting in poor anti-fog coatings. Hydrophilic surfaces which absorb the condensed moisture may also swell in an undesirable manner. Hydrophilic and hydrophobic surfaces can be modified by surface active agents, which are also known as surfactants, to spread or sheet the water across the surface. Surfactants containing both hydrophilic and hydrophobic segments act to minimize surface tension of the water with respect to the surface in an effect called "wetting." The "wetting" of the surface spreads or sheets the water out across the surface, thus minimizing the light scattering effect of the water droplets.

Surfactants are used to provide anti-fog properties to both hydrophilic and hydrophobic surfaces, including polyurethane polymer surfaces formed from polyurethane coatings. These surfactants can be physically associated with the polyurethane surface, such as being applied externally as a temporary film by wiping or spraying the surface. Alternatively, the surfactants can be mixed in with the polyurethane coating composition before it is applied to a substrate, so that the surfactant becomes physically trapped within the polyurethane polymer structure as the polyurethane cures. Such surfactants that are only physically associated with the polyurethane coating are easily washed off or leached away, thereby resulting in temporary anti-fog properties for the polyurethane surface.

SUMMARY

The polyurethane coating compositions described herein, when applied to a substrate and cured, provide transparent, abrasion-resistant, and water-washable anti-fog coatings. These polyurethane coating compositions have surfactants that are chemically associated with the polyurethane so as to minimize leaching out or washing away when the surface of a coating formed from the coating compositions is soaked or washed with water.

In accordance with the embodiments of this invention, the coating compositions comprise isocyanate-reactive surfactants, isocyanate-reactive salts of surfactants, carboxylic-reactive surfactants, or combinations thereof that are chemically bonded to the polyurethane. In addition, the polyurethane comprises hydrophilic main chain segments, hydrophilic side chain segments, or combinations thereof in an amount ranging from about 0.01% to about 40% by weight of the solids of the polyurethane.

The polyurethane coating compositions comprise (A) a first mixture comprising a first polyurethane and a first liquid phase selected from the group consisting of water, an organic solvent, and combinations thereof; or (B) a second mixture comprising a second polyurethane and a second liquid phase selected from the group consisting of water, an organic solvent, and combinations thereof; or (C) a third mixture comprising a third polyurethane and a third liquid phase selected from the group consisting of water, an organic solvent, and combinations thereof.

The first polyurethane comprises the reaction products of a first polyol component comprising a diol having polyethylene oxide side chain segments and at least one additional polyol component different than the first polyol component, a first polyisocyanate component, and a dihydroxy-carboxylic acid neutralized by a carboxylic-reactive amphoteric surfactant to form a salt of the amphoteric surfactant. The first polyisocyanate component comprises at least one polyisocyanate selected from the group consisting of diisocyanates, triisocyanates, derivatives of diisocyanates and triisocyanates capable of forming polyurethane linkages, and combinations thereof. The first polyurethane includes hydrophilic side chain segments in an amount ranging from about 0.01% to about 20% by weight of the solids of the first polyurethane.

The second polyurethane comprises the reaction products of a second polyol component and at least one additional polyol component different than the second polyol component, a second polyisocyanate component comprising at least one partially blocked tri-functional polyisocyanate, an isocyanate-reactive salt of a surfactant, and an isocyanate-reactive cationic surfactant. The second polyol component comprises at least one of (a) a diol having main chain segments selected from the group consisting of polyethylene oxide, polypropylene oxide, and combinations thereof, or (b) a triol having main chain segments selected from the group consisting of polyethylene oxide, polypropylene oxide, and combinations thereof. The second polyurethane includes hydrophilic main chain segments in an amount ranging from about 0.01% to about 20% by weight of the solids of the second polyurethane.

The third polyurethane comprises the reaction products of a third polyol component and at least one additional polyol component different than the third polyol component, a third polyisocyanate component, an isocyanate-reactive salt of a surfactant, and an isocyanate-reactive cationic surfactant. The third polyol component comprises a diol having polyethylene oxide side chain segments and at least one of (a) a diol having main chain segments selected from the group consisting of polyethylene oxide, polypropylene oxide, and combinations thereof, or (b) a triol having main chain segments selected from the group consisting of polyethylene oxide, polypropylene oxide, and combinations thereof. The third polyisocyanate component comprises (i) at least one polyisocyanate selected from the group consisting of diisocyanates, triisocyanates, derivatives of diisocyanates and triisocyanates capable of forming polyurethane linkages, and combinations thereof, and (ii) at least one partially blocked tri-functional polyisocyanate. The third polyurethane includes hydrophilic main chain segments, hydrophilic side chain segments, or combinations thereof in an amount ranging from about 0.01% to about 40% by weight of the solids of the third polyurethane.

The coating compositions in accordance with the embodiments of this invention comprise aqueous polyurethane dispersions, organic solvent polyurethane solutions, or mixtures of an aqueous polyurethane dispersion and an organic solvent polyurethane solution.

In accordance with other embodiments, articles coated with the anti-fog polyurethane coating compositions and processes for applying the coating compositions to a substrate are provided.

The anti-fog polyurethane coating compositions described herein are directly applied to substrates or primer-coated substrates, and then cured, or they are cast as a free-form or self-supporting films that are applied to a substrate after having already cured. The free-form films optionally include an adhesive backing on one or both sides for application to one surface of a substrate or application in-between substrates.

The present compositions are applied as coatings to a substrate surface and are sufficiently flexible to withstand further processing of the substrate, such as molding or shaping, without loss of its properties. A variety of substrates can be employed. Among the preferred substrate materials include transparent plastics such as polycarbonate, acrylic, polyvinylchloride, polybisallyl carbonate, polyethylene terephthalate, polyethylene naphthenate, polyurethane, and polythiourethane. Other substrates include various polyolefins, fluorinated polymers, metals and glass, such as soda-lime glass, borosilicate glass, and acrylic glass among other types of glass, are also used, and if necessary, are used with appropriate pretreatments.

DETAILED DESCRIPTION

In General

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. The present invention may be embodied in different forms, and the reference to the specific embodiments of this application should not be construed to limit the invention to the embodiments described herein. Rather, these embodiments are provided for thoroughness and completeness of this disclosure.

As used in the description of the invention and the appended claims, the singular forms "a," "an," and "the" are intended to include the plural forms as well, unless the context clearly indicates otherwise.

Unless otherwise indicated (e.g., by use of the term "precisely"), all numbers expressing quantities, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention.

Described herein are polyurethane coating compositions that provide transparent, abrasion-resistant, and water-washable anti-fog coatings when applied to a substrate. Embodiments of these coating compositions include aqueous polyurethane dispersions, organic solvent polyurethane solutions, or mixtures of an aqueous polyurethane dispersion and an organic solvent polyurethane solution. The polyurethane coating compositions comprise isocyanate-reactive surfactants, isocyanate-reactive salts of surfactants, carboxylic-reactive surfactants, or combinations thereof chemically bonded to the polyurethane structure. These chemically bonded surfactants provide resistance to fogging by modifying the hydrophilicity or hydrophobicity of the surface of the polyurethane coating applied to the substrate. The surfactants decrease the surface tension of water as it condenses on the surface of the coating. By decreasing the surface tension of the water, the surfactants cause the water to sheet out across the surface, rather than form the tiny droplets that cause light to scatter and give the appearance of fog on the surface of the coating. These surfactants also are useful in dispersing the polyurethane into water to form the aqueous dispersion embodiments of the coating compositions in accordance with this invention.

Furthermore, the polyurethane coating compositions described herein comprise hydrophilic polyurethane polymers or prepolymers that provide anti-fogging properties and also contribute to the dispersibility of the polyurethane in a liquid phase. The polyurethane polymeric particles are made hydrophilic by adding hydrophilic segments to the polyurethane structure, either in the main chain, i.e., backbone, of the polyurethane, or as side chains, i.e., pendant segments. The hydrophilic segments include hydrophilic main chains, hydrophilic side chains, and combinations thereof, and comprise from about 0.01% to about 40% by weight of solids of the polyurethane.

In general, a polyurethane is a polymer characterized by the occurrence of urethane groups [—NH—C=O—O—] and urea groups [—N—H—(C=O)—NH—] in a macromolecular chain. The urethane groups are formed by polyaddition reactions of polyisocyanates with polyols in the presence of a catalyst and other additives or additional reactants. The urea groups are formed by polyaddition reactions of polyisocyanates and polyamines. Polyisocyanates are polymer molecules with two or more isocyanate functional groups, i.e., $R^1$—$(N=C=O)_{n \geq 2}$, and polyols are polymer molecules with two or more hydroxyl functional groups, i.e., $R^2$—$(OH)_{n \geq 2}$. Polyamines are polymer molecules containing two or more amino functional groups, i.e., $R^3$—$(NH_2)_{n \geq 2}$. The polyurethane forming reactions take place in suitable organic solvents.

The coating compositions described herein comprise a mixture of at least one polyurethane and a liquid phase. Suitable liquid phases include water, organic solvents, and mixtures of water and organic solvents. Examples of suitable organic solvents include ketones such as methylethylketone, methylisobutyl ketone, diacetone alcohol, 3,3-dimethyl-2-butanone, and pentanedione; N-methyl pyrrolidone; acetonitrile; esters; glycol esters; glycol ethers such as propylene glycol monomethyl ether (PGME), dipropylene glycol methyl ether, ethylene glycol n-butyl ether, diethylene glycol n-butyl ether, and diethylene glycol methyl ether; alcohols such as methanol, ethanol, n-butanol, isobutanol, and isopropanol; and tertiary alcohols such as tertiary-butyl alcohol, and tertiary-amyl alcohol. Different liquid phases can be selected based on the suitability to the intended application of the coating composition. For example, using organic solvents as all or part of the liquid phase improves wetting on hydrophobic substrates or substrates that do not readily accept aqueous-based compositions, such as dirty or silane treated glass, polycarbonate plastics with a waxy mold release, or plastics like polyethylene terephthalate, polypropylene, and polymethylpentene. Substituting water for all or part of the organic solvents in the liquid phase can reduce the amount of VOC's (volatile organic components) in the coating composition, and if prepared in the form of an aqueous dispersion, can result in a longer shelf life than other certain organic solvent based polyurethane coating compositions, e.g., two-component solvent-based polyurethane systems.

Therefore, in accordance with one embodiment, the coating compositions described herein comprise a polyurethane solution. In this embodiment, the coating composition is a mixture of at least one polyurethane and a liquid phase comprising an organic solvent.

In accordance with another embodiment, polyurethane coating compositions described herein comprise an aqueous polyurethane dispersion. In this embodiment, the coating composition is a mixture of at least one polyurethane and a liquid phase comprising water. The polyurethane is dispersed as polyurethane particles in the water to form the aqueous dispersion.

In accordance with another embodiment, the coating compositions described herein comprise a mixture of an aqueous polyurethane dispersion and an organic solvent polyurethane solution. In this embodiment, the coating composition is a mixture of at least one polyurethane and a liquid phase comprising water and an organic solvent. At least a portion of the polyurethane present in the mixture is dispersed as polyurethane particles in the water to form the aqueous dispersion part of the mixture. The residual non-dispersed polyurethane present in the mixture, which is miscible with the organic solvent, dissolves to form the solution part of the mixture.

Isocyanates readily react with any molecule or compound having an active hydrogen. Therefore, as used herein, the term "isocyanate-reactive" refers to any molecule or compound having an active hydrogen that readily reacts with isocyanate groups. Examples of such active hydrogen compounds include compounds or molecules containing hydroxyl or amine functional groups. Similarly, the term "active hydrogen" compound refers to any molecule or compound having a source of active hydrogen capable of reaction with other molecules or compounds, including being capable of reacting with isocyanate groups. The term "carboxylic-reactive" refers to any base that reacts with a carboxylic acid functional group in a neutralization reaction to form a salt.

The polyurethane coating compositions described herein include isocyanate-reactive cationic surfactants, isocyanate-reactive salts of surfactants, carboxylic-reactive surfactants, or combinations thereof that are chemically bonded to the polyurethane. As used herein, an isocyanate-reactive salt of a surfactant refers to a salt of a surfactant that is isocyanate-reactive or refers to constituent components of a salt that, through an intermediate reaction, forms a salt of a surfactant. Accordingly, isocyanate-reactive salts of surfactants comprise salts having active hydrogen molecules or comprise each of the acids or bases used to form the salt. The chemical bond of these surfactants or salts of the surfactants to the polyurethane polymer structure minimizes leaching or erosion of the surfactant, thereby retaining anti-fogging characteristics of the coating applied to the substrate (i.e., in the faun of a coating composition directly applied to the substrate or primer-coated substrate and subsequently cured, or in the form of a self-supporting film applied to the substrate), even after repeated washing or soaking of the coating.

The coating compositions described herein have extremely long-lasting anti-fog characteristics relative to non-chemically bonded surfactants or surfactants that are only physically associated with the polyurethane polymer present in other polyurethane coatings. In addition to adding long-lasting anti-fog characteristics, the isocyanate-reactive surfactants, the isocyanate-reactive salts of surfactants, or the carboxylic-reactive surfactants at least partially or wholly act as a dispersing agent for aqueous polyurethane dispersion embodiments of the coating compositions described herein.

Polyols

The polyurethane coating compositions described herein comprise a polyurethane having hydrophilic polymer segments in the main polyurethane chain or hydrophilic polymer segments in pendant or side chains of the polyurethane polymer.

The composition of the polyurethane determines the properties of the cured polyurethane coating. More specifically, the polyols that react with the isocyanates to form the polyurethane determine the properties of the polyurethane coating when cured. The polyols generally are active hydrogen molecules, which make them isocyanate-reactive. Suitable polyols used herein include polycarbonate polyols, polyether polyols, and polyester polyols, preferably low molecular weight polyols, including low molecular weight polycarbonate diols or triols, polyether diols or triols, and polyester diols or triols. Other suitable polyols include polyhydric alcohols and alkoxylated polyols; amide-containing polyols; polyacrylic polyols; epoxy polyols; polyhydric polyvinyl alcohols; or mixtures of any of the aforementioned polyols. The reaction of the polyols and isocyanates to form the polyurethane takes place in an organic solvent at high temperatures. The composition of the polyol determines the solubility of the polyol in the organic solvent. High molecular weight polyols, especially those containing primarily urethane linkages, are generally not compatible with organic solvents, and therefore are not preferred as a component for creating the polyurethane coating compositions described herein.

Preferred polyols used herein include diols and triols, including but not limited to low molecular weight polycarbonate diols or triols, polyether diols or triols, or polyester diols or triols. Suitable low molecular weight diols or triols include polyols having a molecular weight ($M_w$) or average molecular weight distribution ($M_n$) range from about 500 to about 6000, preferably from about 1000 to about 5000. Examples of polyols include polyethylene glycol; trimethylol propane monoethoxylate methyl ether; polyhexamethylene carbonate diol; or poly(1,4-butanediol). Additionally, non-polymeric (i.e., monomeric) triols, such as trimethylolethane or trimethylolpropane, are used to form embodiments of the polyurethanes described herein. The rigidity and abrasion resistance of the cured polyurethane coating improves with the use of triols, as the third functional hydroxyl group of the triol promotes and enhances crosslinking in the cured coating.

The selection of the polyol modifies the hydrophilicity of the polyurethane, which affects the fog resistance of the cured polyurethane coating as well as dispersibility of the polyurethane in the liquid phase of a dispersion. Hydrophilic polyols, or polyols containing hydrophilic segments, add to the hydrophilic character of the polyurethane. Examples of hydrophilic polyols include alkoxylated polyether polyols, such as polyols containing polyethylene oxide (e.g., polyethylene glycol in low molecular weight compounds or polyoxyethylene) or polypropylene oxide (polyoxypropylene) segments. These segments comprise the main polymer chain (i.e., polymer backbone) of the polyol, or side chains (i.e., pendant chains) of the polyol, or segments of both the main and side chains of the polyol. Preferred for the polyurethane coating compositions described herein are hydrophilic polyether polyols containing polyethylene oxide main or side chain segments, polypropylene oxide main or side chain segments, or combinations thereof. Examples of suitable hydrophilic polyols include polyethylene glycol; trimethylol propane monoethoxylate methyl ether; diols having polyethylene oxide segments in the main chain, the side chain, or both the main chain and side chain; diols having main chain segments selected from the group consisting of polyethylene oxide, polypropylene oxide, and combinations thereof; and triols having main chain segments selected from the group consisting of polyethylene oxide, polypropylene oxide, and combinations thereof.

Examples of specific suitable hydrophilic polyols include a diol having polyethylene oxide side chains comprising from about 72% to about 90% polyethylene oxide by weight of the polyol, preferably about 75% to about 90% polyethylene oxide by weight of the polyol. This hydrophilic diol having polyethylene oxide side chains is the product of a two step reaction. The first reaction is between a hexamethylene diisocyanate and a mono-methoxy-polyethylene glycol having an average $M_n$ of about 1000. The product of the first reaction is then reacted with diethanolamine to form the hydrophilic diol having polyethylene oxide side chains comprising from about 72% to about 90% polyethylene oxide by weight of the polyol.

An example of a specific suitable diol having main chain segments selected from the group consisting of polyethylene oxide, polypropylene oxide, and combinations thereof includes a polypropylene oxide and polyethylene oxide block copolymer diol comprising polyethylene oxide in the main chain in an amount ranging from about 10% to about 25% by weight of the polyol, preferably polyethylene oxide in the main chain ranging from about 15% to about 20% by weight of the polyol. An example of such a block copolymer diol is Pluronic L-62 (commercially available from BASF Corp of Germany).

An example of a specific suitable triol having main chain segments selected from the group consisting of polyethylene oxide, polypropylene oxide, and combinations thereof includes a polypropylene oxide and polyethylene oxide copolymer triol comprising from about 60% to about 95% polyethylene oxide by weight of the polyol, preferably from about 75% to about 90% polyethylene oxide by weight of the polyol. An example of such a copolymer triol is Poly G 83-34 (commercially available from Arch Chemicals, Inc. of Norwalk, Conn.).

The hydrophilic segments in the main or side chains in the polyol can lead to corresponding hydrophilic main or side chains segments in the polyurethane. The polyurethane coating compositions comprise hydrophilic polyurethane main chain segments, hydrophilic polyurethane side chain segments, or combinations thereof in an amount ranging from about 0.01% to about 40% by weight of the solids of the polyurethane, preferably from about 7% to about 25% by weight of the solids, more preferably from about 10% to about 20% by weight of the solids. Hydrophilic main chain segments comprise from 0 to about 20% by weight of solids of the polyurethane, preferably from 0 to about 15% by weight of the solids. Hydrophilic side chain segments comprise from about 0.01% to about 20% by weight of the solids of the polyurethane, preferably from about 3% to about 17% by weight of the solids.

Preferred hydrophilic polyurethane polymer main chain segments include polyethylene oxide, polypropylene oxide, or combinations thereof. Accordingly, preferred hydrophilic main chain segments comprise polyethylene oxide, polypropylene oxide, or combinations thereof in an amount ranging from 0 to about 20% by weight of the solids of the polyurethane, more preferably from 0 to about 15% by weight of the solids. The preferred hydrophilic side chain segments comprise polyethylene oxide in an amount ranging from about 0.01% to about 20% by weight of the solids of the polyurethane, more preferably from about 3% to about 17% by weight of the solids.

Polyisocyanates

Polyols react with polyisocyanates to form a polyurethane. As used herein, polyisocyanates are multi-functional isocyanates that have isocyanate functionality of greater than or equal to two. Reacting an excess of polyisocyanates with the polyols forms a polyurethane prepolymer, which is a polyurethane polymer with isocyanate-terminated end groups capable of chain extending to a higher molecular weight polyurethane. The polyurethane prepolymer forms as long as the ratio of the isocyanate functional groups of the polyisocyanate to the hydroxyl functional groups of the polyols is greater than or equal to about 1.1:1, i.e., the ratio of the isocyanate moiety to hydroxyl moiety present during the reaction is greater than or equal to about 1.1:1.

At the broadest level, polyisocyanates can be classified as either aliphatic or aromatic polyisocyanates. Aliphatic polyisocyanates generally have better light stability than aromatic polyisocyanates.

Suitable polyisocyanates used in the polyurethane coating compositions described herein include multi-functional isocyanates such as diisocyanates, triisocyanates, derivatives of diisocyanates and triisocyanates capable of forming polyurethane linkages, and combinations thereof. Diisocyanates are isocyanates with an isocyanate functionality of two. Examples of diisocyanates include isophorone diisocyanate (IPDI), hexamethylene diisocyanate (HDI), xylene diisocyanate (XDI), toluene diisocyanate (TDI), diphenylmethane diisocyanate any diisocyanates derived from the foregoing, and combinations thereof. Triisocyanates are isocyanates with an isocyanate functionality of three. Triisocyanates include derivatives of diisocyanates, such as an HDI biuret. Because of their better light stability than the aromatic polyisocyanates, aliphatic polyisocyanates, including but not limited to aliphatic diisocyanates or aliphatic triisocyanates, are preferred for the polyurethane coating compositions described herein. IPDI-type and HDI-type diisocyanates are aliphatic isocyanates.

Certain embodiments of the polyurethane coating compositions described herein include partially blocked or wholly blocked polyisocyanates. Suitable blocking agents used to block the polyisocyanates include active-methyl-type, lactam-type, alcohol-type, oxime-type, and phenolic-type blocking agents. Non-limiting examples of blocking agents include dimethylpyrazole (DMP), i.e., 3,5-dimethylpyrazole; methylethylcetoxime (MEKO); diethyl malonate (DEM);

and the like. Preferred are the DMP-type blocking agent because unblocking occurs at temperatures lower than about 120° C., which is better suited for applications that are sensitive to high temperatures, such as curing a coating on a polycarbonate lens or sheet. Blocking agents that are activated at higher temperatures, such as the previously mentioned oxime-, lactam-, alcohol-, and phenolic-type blocking agents, are better suited for applications where temperature is not an issue, such as curing coatings on metal or glass substrates.

Suitable partially blocked polyisocyanates include partially blocked tri-functional polyisocyanates, such as partially blocked triisocyanates or partially blocked biurets of certain diisocyanates, such as partially blocked HDI biurets. In the partially blocked tri-functional polyisocyanate, of the three isocyanate functional groups, two isocyanate functional groups are blocked with a blocking agent, e.g., DMP, and the third isocyanate functional group is unblocked. The partially blocked polyisocyanate is prepared by reacting two moles of blocking agent for every one mole of tri-functional isocyanate, i.e., two moles of blocking agent for every three moles of isocyanate functional groups. Suitable partially blocked triisocyanates are commercially available, such as the commercially available partially blocked triisocyante Trixene DP9C/012 from Baxenden Chemicals Ltd. of the United Kingdom. An example of a commercially available wholly blocked polyisocyanate is Trixene BI 7961 of Baxenden Chemicals Ltd, which is a wholly blocked HDI biuret.

Polyurethane Formation with Surfactants

The use of a hydrophilic polyol to create a hydrophilic polyurethane, i.e., a polyurethane with hydrophilic main or side chain segments, does not alone provide water-washable anti-fog properties in the cured polyurethane coating (see for example Comparative Examples 1-3, which illustrate that hydrophilic polyurethanes alone do not exhibit anti-fog properties in the cured polyurethane coating). Similarly, in some embodiments, the use of a hydrophilic polyol to create a hydrophilic polyurethane does not alone support the dispersibility of the polyurethane in the liquid phase. The addition of a surfactant chemically bonded to the hydrophilic polyurethane polymer structure, in accordance with the polyurethane coating compositions described herein, results in water-washable anti-fog properties in the cured polyurethane and also supports the dispersion of the polyurethane in a water or combination water and organic solvent liquid phase.

The reaction of the polyols, including at least one hydrophilic polyol, and polyisocyanates takes place in the presence of isocyanate-reactive cationic surfactants, isocyanate-reactive salts of surfactants, isocyanate-reactive carboxylic acids, or combinations thereof which allow these isocyanate-reactive compounds to chemically bond to the main chain or backbone of the polyurethane structure. The isocyanate-reactive cationic surfactant and the isocyanate-reactive salt of a surfactant each directly form a covalent bond attachment to the resulting polyurethane, either as part of the main chain or a side chain. The isocyanate-reactive carboxylic acid directly forms a covalent bond to the resulting polyurethane and provides a reaction site for a carboxylic-reactive amphoteric surfactant, i.e., the carboxylic acid functional group covalently bonded to the polyurethane reacts with an amphoteric surfactant in a neutralization reaction to form a salt of an amphoteric surfactant chemically bonded to the polyurethane.

First Mixture

In accordance with one embodiment, the coating compositions comprise a mixture of a polyurethane and a liquid phase selected from the group consisting of water, an organic solvent, and combinations thereof. The polyurethane comprises the reaction products of polyols, including a diol having polyethylene oxide side chain segments and at least one other polyol different than the diol having polyethylene oxide side chain segments, at least one polyisocyanate, and a dihydroxy-carboxylic acid. In accordance with this embodiment, the polyurethane comprises from about 0.01% to about 20% hydrophilic side chain segments by weight of the solids of the polyurethane. The hydrophilic side chain segments include those described herein, preferably polyethylene oxide.

Suitable polyisocyanates used in accordance with the coating composition of this embodiment include multi-functional isocyanates such as diisocyanates, triisocyanates, derivatives of diisocyanates and triisocyanates capable of forming polyurethane linkages, and combinations thereof. An example of a specific preferred polyisocyanate includes IPDI.

As described above, polyols used in accordance with this embodiment include a diol having polyethylene oxide side chain segments and at least one other polyol different than the diol having polyethylene oxide side chain segments. An example of a suitable diol having polyethylene oxide side chains includes those described herein, preferably a diol having polyethylene oxide side chains comprising polyethylene oxide in an amount ranging from about 72% to about 90% by weight of the polyol. Other suitable polyols include the polyols described herein, such as a diol having main chain segments selected from the group consisting of polyethylene oxide, polypropylene oxide, and combinations thereof; a triol having main chain segments selected from the group consisting of polyethylene oxide, polypropylene oxide, and combinations thereof; an alkyl diol; an alkyl triol; a polycarbonate diol; a polycarbonate triol; or combinations thereof.

The polyurethane resulting from this reaction amongst the polyols, polyisocyanates, and dihydroxy-carboxylic acid has carboxylic acid functional groups incorporated by covalent bonds to the main chain of the polyurethane structure. In accordance with this embodiment, a carboxylic-reactive amphoteric surfactant is introduced and reacts with this polyurethane. The amphoteric surfactant acts as a base and reacts with the carboxylic acid functional group in a neutralization reaction to ionically bond the amphoteric surfactant to the carboxylic acid functional group present in the polyurethane structure.

As a result of this neutralization reaction, the polyurethane has a side chain, i.e., pendant, salt of an amphoteric surfactant chemically bonded to the main chain of the polyurethane polymer structure. This chemically bonded side chain amphoteric surfactant salt of the polyurethane affects the anti-fog properties of the cured polyurethane coating. In the dispersion embodiments of this coating composition, this surfactant salt also supports the dispersibility of the polyurethane in the liquid phase. Without intending to be limited by any theories, the inventors believe that the ionic character of the salt of the amphoteric surfactant allows the surfactant to orient with respect to the surface of cured polyurethane coating or to orient within the dispersed polyurethane particles to enhance the anti-fog and disperability properties associated with the polyurethane. The chemical bonding of the carboxylic-reactive amphoteric surfactant to the backbone of the polyurethane polymer results in a long-lasting anti-fog coating that remains after repeated washing of the surface of the polyurethane coating, after soaking the coating in water, or after both repeated washing and soaking.

The dihydroxy-carboxylic acids used in accordance with the present embodiment are isocyanate-reactive. The dihydroxy-carboxylic acid covalently bonds to the polyurethane polymer structure specifically through a condensation reaction of each of the two isocyanate-reactive hydroxyl functional groups of the dihydroxy-carboxylic acid to an isocyanate functional group of a polyisocyanate, such as a diisocyanate, to covalently bond the carboxylic functional group as a segment in the main chain of the polyurethane. This ensures that the ionic bond formed during the neutralization reaction between the amphoteric surfactant and the carboxylic acid functional group is covalently anchored within the main chain of the polyurethane.

Suitable dihydroxy-carboxylic acids include any carboxylic acid having at least two hydroxyl functional groups. Dihydroxy-carboxylic acids are represented by the general form of $(OH)_2R^4(COOH)$, wherein $R^4$ is an unbranched or branched alkyl group having from about one to about 12 carbon atoms. Examples of dihydroxy-carboxylic acids include, without limitation, dimethylolpropionic acid (DMPA), dimethylolbutanoic acid (DMBA), and other dihydroxy-derivatives of ethanoic acid, propanoic acid, butanoic acid, pentanoic acid, hexanoic, decanoic acid, dodecanoic acid, and the like. A preferred dihydroxy-carboxylic acid used in the polyurethane coating compositions includes DMPA. As described above, such carboxylic acid functional groups covalently incorporated into the main chain of the polyurethane polymer are neutralized by the amphoteric surfactant to form a salt of the amphoteric surfactant.

Amphoteric surfactants, which may also sometimes be referred to as zwitterionic surfactants, are carboxylic-reactive surfactants that generally carry an overall formal net charge of zero, and therefore carry a net neutral charge. However, these surfactants carry different formal charges on different atoms within the compound. Having different formal charges within the surfactant compound gives the amphoteric surfactant the flexibility to act as a cationic surfactant, an anionic surfactant, or a non-ionic surfactant depending on the pH of the solution or the environment surrounding the amphoteric surfactant. Amphoteric surfactants are generally derived from cationic compounds, such as quaternary ammonium, phosphonium, and sulfonium compounds, and include an anionic substituent group such as a carboxylate, sulfonate, sulfate, phosphate, phosphonate, and the like.

Examples of preferred amphoteric surfactants include amine oxides and alkyl betaines. Amine oxides are oxides of tertiary amines and are represented by the general form of $R_3^5-N^+-O^-$, wherein $R^5$ is selected from the group consisting of a hydrogen, an unbranched alkyl group having from about 8 to about 18 carbon atoms, and combinations thereof, and wherein at least one $R^5$ is an unbranched alkyl group having from about 8 to about 18 carbon atoms. Alkyl betaines, another type of suitable amphoteric surfactant, may be represented by the general form $R^6-N^+-(CH_3)_2-CH_2-(C=O)-O^-$, wherein $R^6$ preferably is an unbranched alkyl group having from about 8 to about 18 carbon atoms. $R^6$ further includes an unbranched alkyl group having from about 8 to about 18 carbon atoms with amido functionality. An example of an alkyl betaine with amido functionality is lauramidopropyl betaine. Those of ordinary skill in the art understand that amine oxides or alkyl betaines are added in an amount sufficient to neutralize the carboxylic acid functional groups on the polyurethane. The neutralized amines from the surfactant salts of amphoteric surfactants and carboxylic acid functional groups comprise from about 2% to about 15% by weight of the solids of the polyurethane, preferably from about 5% to about 12% by weight of the solids.

In accordance with this embodiment of the coating compositions described herein, the polyisocyanates optionally further comprise blocked polyisocyanates. A non-limiting example of a blocked polyisocyanate used is a DMP blocked HDI biuret. In addition to the curative properties of blocked polyisocyanates, the introduction of blocked polyisocyanates enhances the abrasion resistance of the cured coatings. This is shown in Examples 3 and 4 below. The only difference between the coating compositions of Examples 3 and 4 is that a DMP blocked HDI biuret is added to the polyurethane prepolymer mixture of Example 4 as an additive after the prepolymer reaction and after the prepolymer has cooled. In such compositions incorporating the blocked polyisocyanate, the blocked polyisocyanates comprise from 0 to about 10% by weight of the solids of the polyurethane, preferably from about 0 to about 5% by weight of the solids. The cured coating of Example 4 exhibits better abrasion resistance formed with the blocked polyisocyanate than the comparable cured coating of Example 3 formed without the blocked polyisocyanate. The cured coating of Example 4 exhibits an increase in haze of about 10.7% after the falling sand abrasion test, which is less than the about 16.3% increase in haze for this same test of the cured coating of Example 3. The smaller increase in haze after the falling sand abrasion test shows that the coating of Example 4 exhibits a greater resistance to abrasion than the coating of Example 3. Therefore, the addition of the blocked polyisocyanate to Example 4, in what would otherwise be an identical coating composition to Example 3, enhances the abrasion resistance of the cured coating.

Second Mixture

In accordance with another embodiment, the coating compositions comprise a mixture of a polyurethane and a liquid phase selected from the group consisting of water, an organic solvent, and combinations thereof. The polyurethane comprises the reaction products of polyols, at least one partially blocked tri-functional polyisocyanate, an isocyanate-reactive salt of surfactant, and an isocyanate-reactive cationic surfactant. The polyols used in accordance with this embodiment include at least one of (a) a diol having main chain segments selected from the group consisting of polyethylene oxide, polypropylene oxide, and combinations thereof, or (b) a triol having main chain segments selected from the group consisting of polyethylene oxide, polypropylene oxide, and combinations thereof. The polyols also include at least one other polyol different than (a) and (b). Because the salt of a surfactant and the cationic surfactant are each isocyanate-reactive, the salt of a surfactant and cationic surfactant react with free isocyanate functional groups when reacted in the presence of the polyols and polyisocyanates during the reaction forming the polyurethane. In accordance with this embodiment, the polyurethane comprises from about 0.01% to about 20% hydrophilic main chain segments by weight of the solids of the polyurethane. The hydrophilic main chain segments include those described herein, preferably polyethylene oxide, polypropylene oxide, or combinations thereof.

As described above, polyols used in accordance with this embodiment include at at least one other polyol different than (a) a diol having main chain segments selected from the group consisting of polyethylene oxide, polypropylene oxide, and combinations thereof, and (b) a triol having main chain segments selected from the group consisting of polyethylene oxide, polypropylene oxide, and combinations thereof. Examples of such polyols suitable for this embodiment include the polyols described herein, such as a diol having polyethylene oxide side chain segments; an alkyl diol; an alkyl triol; a polycarbonate diol; a polycarbonate triol; or combinations thereof.

Suitable diols having main chain segments selected from the group consisting of polyethylene oxide, polypropylene oxide, and combinations thereof used in accordance with this embodiment include those described herein, preferably a polypropylene oxide and polyethylene oxide block copolymer diol comprising polyethylene oxide in the main chain in an amount ranging from about 10% to about 25% by weight of the polyol.

Suitable triols having main chain segments selected from the group consisting of polyethylene oxide, polypropylene oxide, and combinations thereof used in accordance with this embodiment include those described herein, preferably a polypropylene oxide and polyethylene oxide copolymer triol comprising from about 60% to about 95% polyethylene oxide by weight of the polyol.

In accordance with this embodiment, the polyisocyanates comprise partially blocked tri-functional polyisocyanates, such as partially blocked triisocyanates or partially blocked biurets of diisocyanates, e.g., a partially blocked HDI biuret. As described above, of the three isocyanate functional groups in the partially blocked tri-functional isocyanate, two isocyanate functional groups are blocked with a blocking agent, e.g., DMP, and the third isocyanate functional group is unblocked. Moreover, in accordance with this embodiment, blocked polyisocyanates comprise from about 5% to about 60% by weight of the solids of the polyurethane.

The use of partially blocked polyisocyanates described in the foregoing also advantageously enhances resistance to chemicals in the cured coating. Besides being fog resistant after repeated washing and soaking with water and besides exhibiting abrasion resistance (see Example 8), it has been unexpectedly discovered that cured coatings prepared with partially blocked polyisocyanates in accordance with this embodiment withstand washing with chemicals, such as washing the cured coating with toluene or methylethylketone. Accordingly, the resulting cured coatings of this embodiment provides long-lasting anti-fog, abrasion-resistant, and chemical-resistant properties.

In accordance with the present embodiment, the polyisocyanates optionally further comprise a polyisocyanate such as diisocyanates, triisocyanates, derivatives of diisocyanates and triisocyanates capable of forming polyurethane linkages, and combinations thereof as described herein. The isocyanate-reactive salt of a surfactant, the isocyanate-reactive cationic surfactant, and the polyols react in the presence of (a) at least one polyisocyanate, i.e., diisocyanates, triisocyanates, derivatives of diisocyanates and triisocyanates capable of forming polyurethane linkages, and combinations thereof, and (b) at least one partially blocked tri-functional polyisocyanate. An example of a preferred polyisocyanate used in this embodiment includes IPDI. Moreover, the polyisocyantes used in accordance with this embodiment comprise from about 0% to about 30% by weight of the solids of the polyurethane, preferably from about 0% to about 21% by weight of the solids.

Also in accordance with this embodiment, the isocyanate-reactive salt of a surfactant contemplated herein is the product of a neutralization reaction between an acid of an anionic surfactant and a base containing at least one isocyanate-reactive functional group, such as a hydroxyl functional group, so as to incorporate the isocyanate-reactive functionality into the salt. Suitable isocyanate-reactive anionic salts of surfactants include active hydrogen amine salts of alkyl sulfonic acids, active hydrogen amine salts of alkybenzene sulfonic acids, amino-alcohol sulfonates, particularly sulfonates having an alkyl chain with at least about 16 carbon atoms in the chain. Preferably, the isocyanate-reactive salt of a surfactant is mono-functional, i.e., the isocyanate-reactive salt of a surfactant preferably has a single isocyanate-reactive functional group. The mono-functional salt of a surfactant forms side chains covalently bonded to the polyurethane main chain with the surfactant salt's single isocyanate-reactive functional group. One example of such mono-functional preferred salt includes a salt of dimethylaminomethylpropanol and dodecylbenzene sulfonic acid. The isocyanate-reactive salt of a surfactant comprises from about 0.1% to about 7% by weight of the solids of the polyurethane, preferably from about 2% to about 5% by weight of the solids.

Without intending to be limited by any theories, the inventors believe that the ionic bond forming the salt portion of the isocyanate-reactive salt of a surfactant compound allows the hydrophilic and hydrophobic segments of the surfactant to orient to the surface of the polyurethane in the cured coating to provide anti-fog effects for the cured coating and to orient relative to the polyurethane within the coating composition to aid in the dispersibility of the polyurethane in the liquid phase of the dispersion embodiments of this coating composition.

In accordance with this embodiment, the isocyanate-reactive cationic surfactant comprises a quaternary ammonium, phosphonium, or sulfonium surfactant having at least one isocyanate-reactive functional group and a long hydrocarbon chain hydrophobic tail. The long chain hydrophobic hydrocarbon tail of the isocyanate-reactive cationic surfactant generally has at least about 16 carbon atoms and includes amido functional groups, preferably the long chain hydrophobic tail has at least about 18 carbon atoms. Also, the isocyanate-reactive cationic surfactant preferably has two hydrophilic isocyanate-reactive functional groups, i.e., the isocyanate-reactive cationic surfactant is di-functional. The two hydrophilic isocyanate-reactive functional groups include an alkoxylated chain terminated with a hydroxyl functional group. These two hydrophilic groups react with free isocyanate functional groups present in the reaction mixture to covalently bond the di-functional isocyanate-reactive cationic surfactant as part of the main chain of the polyurethane. The alkoxylated segments on the two chains include, but are not limited to, hydroxyethyl functional groups, which further adds to the hydrophilic character of the overall polyurethane polymer structure. Examples of suitable di-functional isocyanate cationic surfactants include bis(polyhydroxyethyl) quaternary ammonium surfactants having stearamide or stearamidopropyl functional groups or N,N-bis(2-hydroxyethyl)-n-(3-dodecyloxy-2-hydroxypropyl) methylammonium sulfate. The isocyanate-reactive cationic surfactant comprises from about 0.1% to about 20% by weight of the solids of the polyurethane, preferably from about 4% to about 10% by weight of the solids.

The combination of the isocyanate-reactive cationic surfactant with the isocyanate-reactive salt of a surfactant enhances the anti-fog properties of the cured polyurethane coating and also enhances the dispersibility of the polyurethane in the dispersion embodiment of this coating composition. In addition, this combination of the isocyanate-reactive cationic surfactant with the isocyanate-reactive salt of a surfactant in the coating composition further improves the anti-fog properties of the resulting coating over a respective coating from a composition having only the isocyanate-reactive salt of a surfactant (i.e., compare Example 5 below with Example 8).

In accordance with the present embodiment, optional, non-reactive surfactants can be mixed in to the polyurethane coating composition during or after the reactions forming the polyurethane to enhance or supplement the anti-fog properties of the resulting cured coating. For example, in the context of preparing a dispersion in accordance with this embodiment (as discussed below), the non-reactive surfactant can be mixed with the coating composition during any of the polyurethane prepolymer, dispersion, and final polymerization steps. Examples of suitable types of non-reactive surfactants include anionic surfactants, cationic surfactants, and non-ionic surfactants. The preferred type of non-reactive surfactants are anionic surfactants.

In certain embodiments, without intending to be limited by any theories, the inventors believe that the addition of a non-reactive anionic surfactant to the polyurethane comprising the isocyanate-reactive salt of a surfactant and the isocyanate-reactive cationic surfactant develops an ionic relationship with the cationic surfactant incorporated into the main chain of the polyurethane polymer, which reduces the leaching or erosion of the non-reactive anionic surfactant from the polyurethane coating. A non-limiting specific example of a non-reactive anionic surfactant is sodium dioctylsulfosuccinate.

Third Mixture

In accordance with another embodiment, the coating compositions comprise a mixture of a polyurethane and a liquid phase selected from the group consisting of water, an organic solvent, and combinations thereof. The polyurethane comprises the reaction products of polyols; polyisocyanates, including at least one polyisocyanate and at least one partially blocked tri-functional polyisocyanate; an isocyanate-reactive salt of surfactant; and an isocyanate-reactive cationic surfactant. The polyols in accordance with this embodiment include at least one of (a) a diol having main chain segments selected from the group consisting of polyethylene oxide, polypropylene oxide, and combinations thereof, or (b) a triol having main chain segments selected from the group consisting of polyethylene oxide, polypropylene oxide, and combinations thereof. The polyols also include (c) a diol having polyethylene oxide side chain segments and (d) at least one other polyol different than (a), (b), and (c). In accordance with this embodiment, the polyurethane comprises hydrophilic main chain segments, hydrophilic side chain segments, or combinations thereof in an amount ranging from about 0.01% to about 40% by weight of the solids of the polyurethane. The hydrophilic side chain segments include those described herein, preferably polyethylene oxide. The hydrophilic main chain segments include those described herein, preferably polyethylene oxide, polypropylene oxide, or combinations thereof.

As described above, polyols used in accordance with this embodiment include (d) at at least one other polyol different than (a) a diol having main chain segments selected from the group consisting of polyethylene oxide, polypropylene oxide, and combinations thereof, (b) a triol having main chain segments selected from the group consisting of polyethylene oxide, polypropylene oxide, and combinations thereof, and (c) a diol having polyethylene oxide side chain segments. Examples of such polyols include the polyols described herein, such as an alkyl diol, an alkyl triol, a polycarbonate diol, a polycarbonate triol, or combinations thereof.

An example of a suitable diol having polyethylene oxide side chains includes those described herein, preferably a diol having polyethylene oxide side chains comprising polyethylene oxide in an amount ranging from about 72% to about 90% by weight of the polyol.

Suitable diols having main chain segments selected from the group consisting of polyethylene oxide, polypropylene oxide, and combinations thereof include those described herein, preferably a polypropylene oxide and polyethylene oxide block copolymer diol comprising polyethylene oxide in the main chain in an amount ranging from about 10% to about 25% by weight of the polyol.

Suitable triols having main chain segments selected from the group consisting of polyethylene oxide, polypropylene oxide, and combinations thereof used in accordance with this embodiment include those described herein, preferably a polypropylene oxide and polyethylene oxide copolymer triol comprising from about 60% to about 95% polyethylene oxide by weight of the polyol.

The polyisocyanates used in accordance with this embodiment include (i) at least one polyisocyanate as described herein, i.e., diisocyanates, triisocyanates, derivatives of diisocyanates and triisocyanates capable of forming polyurethane linkages, and combinations thereof, and (ii) at least one partially blocked tri-functional polyisocyanate. The partially blocked tri-functional polyisocyanates include those described herein, preferably a partially blocked triisocyanate or a partially blocked biuret of a diisocyanate. In accordance with this embodiment, the blocked polyisocyanates comprise from about 5% to about 60% by weight of the solids of the polyurethane.

Suitable isocyanate-reactive salts of a surfactant used in accordance with this embodiment include those described herein, preferably the mono-functional isocyanate-reactive salts of a surfactant described above. The isocyanate-reactive salt of a surfactant comprises from about 0.1% to about 7% by weight of the solids of the polyurethane, preferably from about 0.1% to about 5% by weight of the solids. Suitable isocyanate-reactive cationic surfactants used in accordance with this embodiment include those described herein, preferably the di-functional isocyanate reactive cationic surfactants described above. The isocyanate-reactive cationic surfactant comprises from about 0.1% to about 20% by weight of the solids of the polyurethane, preferably from about 0.1% to about 10% by weight of the solids.

In accordance with the present embodiment, optional, non-reactive surfactants as described herein, preferably non-reactive anionic surfactants, can be mixed in to the polyurethane coating composition during or after the reactions forming the polyurethane.

Fourth Mixture

In accordance with another embodiment, the polyurethane coating compositions result from a combination of the first mixture described herein and the second mixture described herein. As discussed in greater detail above, the first mixture comprises a liquid phase and a polyurethane. The polyurethane of the first mixture comprises the reaction products of polyols, including a diol having polyethylene oxide side chain segments and at least one other polyol different than the diol having polyethylene oxide side chain segments, at least one polyisocyanate, and a dihydroxy-carboxylic acid neutralized by a carboxylic-reactive amphoteric surfactant to form a salt of the amphoteric surfactant. The second mixture, as discussed in greater detail above, comprises a liquid phase and a polyurethane. The polyurethane of the second mixture comprises the reaction products of polyols, at least one partially blocked tri-functional polyisocyanate, an isocyanate-reactive salt of surfactant, and an isocyanate-reactive cationic surfactant. The polyols used in the second mixture include at least one of (a) a diol having main chain segments selected from the group consisting of polyethylene oxide, polypropylene oxide, and combinations thereof, or (b) a triol having main chain segments selected from the group consisting of polyethylene oxide, polypropylene oxide, and combinations thereof. The polyols used in the second mixture also include at least one other polyol different than (a) and (b). The liquid phase for the first mixture, the second mixture, or both the first mixture and the second mixture is selected from the group consisting of water, an organic solvent, and combinations thereof.

Further in accordance with the coating compositions of this embodiment, additional liquid selected from the group consisting of water, an organic solvent, and combinations thereof is added in suitable amounts to the combination of the first mixture and second mixture to obtain the desired viscosity suitable for the intended application.

Organic Solvents Used in Polyurethane Formation

The selection of suitable organic solvents used in the polyurethane formation reactions for the coating compositions described herein is dependent upon the selection of constituent components reacted to form the polyurethane, including those solvents able to dissolve the selected polyols and solvents that do not readily react with the polyisocyanates. Examples of suitable organic solvents useful for such reactions include ketones such as methylethylketone, methylisobutyl ketone, diacetone alcohol, 3,3-dimethyl-2-butanone, and pentanedione; N-methyl pyrrolidone; acetonitrile; esters; glycol esters; and tertiary alcohols such as tertiary-butyl alcohol and tertiary-amyl alcohol.

Catalysts

In addition, catalysts are added along with the reactants used to prepare the polyurethane. Suitable catalysts useful for the preparation of the polyurethane prepolymer include metal carboxylates (i.e., metal salts of carboxylic acids), such a tin(II) ethylhexanoate, dibutyltindilaurate, and dibutylin bis (octylmaleate).

Aqueous Dispersions

With respect to the aqueous dispersion embodiment of the coating compositions described herein, the preparation of the aqueous polyurethane dispersion can generally be classified as taking place within three steps, although one of ordinary skill in the art would understand that these three steps are not mutually exclusive from each other. Moreover, this specification describes the present embodiment in the context of these steps for clarity, and the embodiments or features of the present invention should not be construed as being limited to these steps or dispersions in general. Furthermore, these three steps should not be construed as being limited to this order, but rather these steps can take place in a different orders, or can take place concurrently, or in combinations thereof.

In general, the three steps include 1) a polyurethane prepolymer formation step, 2) a dispersion step, and 3) a final polymerization step. The first step generally relates to the creation of a polyurethane prepolymer through reactions between the polyisocyanates and polyols in an organic solvent at high temperatures. The prepolymer is a polyurethane molecule having isocyanate-terminated functional groups. The prepolymer is formed when the poloyls react with a surplus of the polyisocyanates, preferably when the stoichiometric ratio of isocyanate functional groups of the polyisocyanates to the hydroxyl functional groups of the polyols is greater than or equal to about 1.1:1. Any suitable polyols and polyisocyanates, as described herein, can be used to form the prepolymers in accordance with the embodiments of the coating compositions of the present invention. Additional components used to form the polyurethanes as described herein are also present in the reactions forming the polyurethane prepolymer. For example, a dihydroxy-carboxylic acid, an isocyanate-reactive salt of a surfactant, and an isocyanate-reactive cationic surfactant are present for certain embodiments during the reactions forming the polyurethane prepolymer.

The second step generally includes the dispersion of the prepolymer into the liquid phase, i.e., water or water in combination with an organic solvent, to form a stable colloidal dispersion. Polyurethane prepolymers are generally dispersed into the liquid phase with the aid of a dispersing agent, which can be anionic, cationic, or non-ionic dispersing agents. An example of an anionic dispersing agent is an anionic surfactant, such as the tertiary amine triethanolamine. Examples of cationic dispersing agents include quaternary ammonium surfactants. Non-ionic dispersing agents can include non-ionic surfactants, i.e., hydrophilic segments in the polyurethane polymer structure such as polyethylene oxide segments in the main chain or side chains. By reacting the dispersing agent with the polyurethane prepolymer, the prepolymer gains water miscible or solvable groups that aid in dispersing the prepolymer particle in the liquid phase. The carboxylic-reactive amphoteric surfactant used in accordance with embodiments of the coating compositions described herein are added prior to or during the dispersion step.

In this second basic step of preparing polyurethane dispersion, the polyurethane prepolymer can be dispersed in the presence of water or another liquid medium with the aid of agitation such as mechanical stress or mechanical mixing to form the dispersed phase of the aqueous dispersion. The mechanical stress includes high shear mechanical stress or mixing caused with the aid of a device such as a high shear disperser, a homogenizer, or other device capable of dispersing polyurethane particles. The dispersion takes place during or after the addition of the carboxylic-reactive amphoteric surfactant in certain embodiments, which neutralizes carboxylic acid functional groups present on the polyurethane prepolymer to form a salt of the amphoteric surfactant chemically bonded to the prepolymer and which assists in the dispersibility of the polyurethane. The dispersion step also preferably occurs after the isocyanate-reactive salt of a surfactant and isocyanate-reactive cationic surfactant are added to embodiments of the coating compositions described herein. These surfactants also assist in the dispersibility of the polyurethane.

The third step in preparing an aqueous polyurethane dispersion is the final polymerization step. The final polymerization step is the extension of the polyurethane polymer chains to a higher molecular weight polyurethane polymer. The isocyanate-terminated end groups in the prepolymer react in the presence of the chain extenders, such as multifunctional amines, multi-functional polyols, urea, or combinations thereof, to extend the polyurethane prepolymers to the higher molecular weight dispersed polyurethane polymer particles. Specific examples of suitable chain extenders useful in accordance with the coating compositions described herein include hydrazine monohydrate, aqueous hydrazine (30%), 1,6-hexanediamine, 2-(2-aminoethyl)aminoethanol, or combinations thereof. The three steps used to describe this process of preparing dispersions are not mutually exclusive of each other, the final polymerization step can take place before, during, or after the dispersion step.

Descriptions of the final polymerization is not intended to be limiting. Often it is desirable to produce compositions with lower molecular weights by reducing the amount of chain extension agent or omitting the chain extension agent altogether. Therefore, in some embodiments, the polyurethane prepolymer, a lower molecular weight polyurethane produced with a reduced amount of chain extenders, or both the prepolymer and the lower molecular weight polyurethane are the polyurethanes in the final coating composition.

Similarly, the descriptions provided herein with respect to the dispersion steps are not intended to be limited to only water-based dispersions. As discussed above, in some embodiments, the non-aqueous liquids, such as organic solvents, are substituted for water to disperse or dissolve the described polyurethane compositions to promote suitability for specific applications.

Application

Upon obtaining the final coating composition, the aqueous polyurethane dispersion, the organic solvent polyurethane solution, or the mixture of an aqueous polyurethane dispersion and an organic solvent polyurethane solution are cooled to a storage stable temperature, such as ambient temperature. The coating composition is ready to be applied as coating to a substrate, which upon curing, forms a transparent, abrasion-resistant, and water-washable anti-fog coating. The coating is applied directly to the substrate or is cast as a free-form film that is later applied to the substrate.

An effective amount of a leveling or flow-control agent optionally is incorporated into the coating composition described herein to spread more evenly or level the composition on the surface of the substrate and to provide substantially uniform contact with the substrate. The amount of the leveling or flow control agent can vary widely but is used in an amount sufficient to provide the coating composition with from about 10 to about 5,000 ppm of the leveling or flow control agent. Any conventional, commercially available leveling or flow control agent which is compatible with the coating composition and the substrate, which is capable of leveling the coating composition on a substrate, and which enhances wetting between the coating composition and the substrate is employed. Non-limiting examples of such flow-control agents include polyethers, silicones, fluorosurfactants, polyacrylates, or fluoro-modified polyacrylates.

The polyurethane coating compositions described herein are applied in any suitable manner to a substrate. For example, the compositions of the invention are applied to solid substrates by conventional methods, such as flow coating, spray coating, curtain coating, dip coating, spin coating, roll coating, and the like to form a continuous surface film on the substrate.

The polyurethane coating compositions are also prepared as free-form or unsupported films that are applied to the substrate as the film after curing. The free-form film is prepared in any suitable manner known to those skilled in the art, such as a preparing a free film through casting, spraying, molding, injection, frothing or similar techniques. The free-form film optionally has an adhesive or tack bonded to at least one surface of the film so as to allow the free-form film to bond to the substrate through the adhesive.

The polyurethane coating compositions described herein are applied as a coating to rigid substrate surfaces or substrate surfaces that are sufficiently flexible to withstand further processing of the substrate, such as molding or shaping, without loss of its properties. A variety of substrates are employed. Among the preferred substrate materials include transparent plastics such as polycarbonate, acrylic, polyvinylchloride, polybisallyl carbonate, polyethylene terephthalate, polyethylene naphthenate, polyurethane, and polythiourethane. Other substrates include various polyolefins, fluorinated polymers, metals and glass, such as soda-lime glass, borosilicate glass, acrylic glass among other types of glass, are used with appropriate pretreatments, if necessary. In some embodiments, hydrophobic substrates or substrates which do not readily accept aqueous-based coating compositions are used. Non-limiting examples of such substrate materials include dirty or silane treated glass, polycarbonate plastics with a waxy mold release, or plastics like polypropylene and polymethylpentene. The substrate optionally has an adhesive or tack bonded to any uncoated surface.

A feature of some embodiments of the polyurethane coating compositions described herein is the ability to dry to an essentially tack-free state at temperatures below 100° C. when applied as a coating to an article. Clean-room conditions are not always practical in the higher temperature commercial ovens used for final curing. Coatings which do not dry tack-free can pick up dust or other airborne debris present in these non-clean-room higher temperature curing ovens, thereby reducing the quality and cosmetic appearance of such coatings. Therefore, drying the coatings to a tack-free condition in clean-room ovens at lower temperatures, e.g., temperatures below 100° C., before moving the articles to the higher temperature non-clean room ovens provides advantages over coating compositions which do not dry tack-free. A higher molecular weight of the polyurethane polymer structure improves the ability of the polyurethane coatings to dry tack-free. In accordance with embodiments of the polyurethane coating compositions disclosed herein, reacting unblocked multi-functional isocyanates with polyols provides a higher molecular weight polyurethane polymer structure as compared to reacting wholly or partially blocked multi-functional isocyanates with such polyols. Specific embodiments of the coating compositions described herein which dry tack-free include Examples 1-4, 9, and 10-12.

The present anti-fog coating compositions, when applied directly or as free-form films to substrates, are used in a wide variety of applications. For example, the anti-fog coatings can be applied on ophthamalic substrates, such as optical lenses for use in eyeglasses or sunglasses, lenses used in protective eyewear, and the like. The anti-fog coatings are applied in automotive applications (including automobiles, commercial vehicles, and motorcycles), such as on windshields, windows, instrument gauge coverings, interior surfaces of headlamps, interior surfaces of dome lights, and the like. The coatings are applied in applications that often are subjected to or are constantly subjected to humidity or temperature conditions that would tend to cause fogging. Non-limiting examples of applications having such conditions are washroom mirrors, storefront windows, and refrigeration units, such as clear refrigerator or freezer doors used in grocery stores or supermarkets.

Other Embodiments

In accordance with further embodiments of the present invention, articles are provided. The articles comprise a substrate and a coating formed on at least one surface of the substrate. The coating is formed by curing a coating composition in accordance with the polyurethane coating compositions described herein directly on the substrate or a primer-coated substrate or by applying a free-form film prepared from the polyurethane coating compositions described herein.

In accordance with further embodiments of the present invention, processes are provided. In one embodiment, the process comprises applying the polyurethane coating compositions described herein to at least one surface of a substrate. The coating compositions are applied directly to the substrate or a primer-coated substrate by flow coating, spray coating, curtain coating, dip coating, spin coating, roll coating, or other suitable technique to create a continuous film on the at least one surface of the substrate. The coating composition applied to the at least one surface of the substrate is cured to form a transparent, abrasion-resistant, water-washable anti-fog coating.

In another embodiment, the process comprises applying a free-form film prepared from the coating compositions described herein to at least one surface of a substrate to form a transparent, abrasion-resistant, water-washable anti-fog coating. The free-form film cures prior to applying to the at least one surface of the substrate. The process further comprises adhering the free-form film to the substrate by an adhesive bonded to at least one surface of the film.

The following analytical test methods and examples are for purposes of illustration only and are not intended to limit the scope of the invention as defined in the claims which are appended hereto.

ANALYTICAL TEST METHODS

Parameters and values used to quantify certain elements of the present invention, including but not limited to, the examples presented herein are described in detail as follows:

Substrate used: Unless otherwise indicated in the Examples below, polycarbonate substrates, including polycarbonate lenses or polycarbonate sheets, are used.

Application of the aqueous polyurethane dispersion to a lens: Five or six polycarbonate lenses are dip-coated in the aqueous polyurethane dispersion coating composition having a 12 inch/min draw speed for each Example described herein. Several of the dip-coated lenses described in the Examples are allowed to dry or are subject to other pre-curing conditions for a period of time prior to curing. The coated lenses are then treated with heat at a specific temperature for a specified amount of time to cure the coating applied to the lens. Different polyurethane coated lenses are used for the different types of tests within each Example, i.e., one coated lens is used for the adhesion test and another coated lens is used for the anti-fogging tests.

Coating thickness measurement: The measurement of the coating thickness of the polyurethane coated polycarbonate lens is made using an F-20 Film Measurement Unit with a contact stage, available from Filmetrics, Inc. of San Diego, Calif. The coating thickness reported in the Examples is an average value of the coating thickness for the 5 or 6 lenses per Example.

Adhesion test: The polyurethane coated polycarbonate lens is soaked in boiling water for 1 hour. After cooling and drying, a cross-hatched pattern is made on the coating of the lens with a razor blade. Tape is then applied to the cross-hatched section of the coated lens. After the tape is applied, the tape is removed from the coating. The application and removal of the tape is repeated three times. If any of the coating is removed from the lens due to the repeated application and removal of the tape, then the coating composition fails the test. If none of the coating is removed from the lens during the repeated application and removal of the tape, then them coating composition passes the test. The tape used in accordance with the adhesion test is Scotch® brand tape, Scotch 600 from 3M Company of St. Paul, Minn.

Initial anti-fogging test: Without the polyurethane coated lens being treated or modified in any other manner, i.e., before soaking the coated polycarbonate lens in water, the coated lens is placed at a standard height above a source of 50° C. water in a manner to expose the lens to water vapor from the water source for 3 minutes. If no fog appears on the polyurethane coated lens in this period of time, the coating composition passes the initial anti-fogging test. Otherwise, if fog appears on the coated lens, then the coating composition fails the initial anti-fogging test.

Anti-fogging after soaking for 1 hour test: A coated polyurethane lens is soaked in water at room temperature for 1 hour. After allowing the coated lens to recover for 12 hours from the soaking, this coated lens is placed at the standard height above a source of 50° C. water in a manner to expose the lens to water vapor from the water source for at least 8 seconds in accordance with EN166/EN168 anti-fog performance specifications. If no fog appears on the polyurethane coated lens in this period of time, the coating composition passes this anti-fogging test. Otherwise, if fog appears on the coated lens, then the coating composition fails this anti-fogging test.

Initial haze test: The percent haze of the coated polycarbonate lens is measured using a Haze-Gard Plus available from BYK Gardner USA of Columbia, Md. The measurement of the haze using the Haze-Gard Plus is a quantification of the amount of light scattered as a result of the transmission of the light through the coated polycarbonate lens. The initial haze percent is measured shortly after curing the polyurethane coating on the substrate lens and before any other coated lens is modified or treated in any other way, i.e., before soaking the coated polycarbonate lens in water or before subjecting the lens to falling sand.

Haze after soaking for 1 hour test: The percent haze of the coated lens is measured with the Haze-Gard Plus immediately after soaking the coated lens in room temperature water for 1 hour. Haze greater than or equal to about 1% is visible on the surface of the coated lens substrate. Conversely, haze less than or equal to about 1% is not visible on the coated lens. The haze test after soaking passes if the lens is clear and haze is not visible on the coated lens.

Falling sand abrasion test: A coated polycarbonate lens is set on an HP-1160 Gardner Falling Sand Apparatus, available from Paul N. Gardner Company of Pompano Beach, Fla. Three (3) kilograms of ASTM 20-30 sand falls through the HP-1160 Apparatus onto the coated polycarbonate lens in accordance with EN166/168 specification. After washing the coated polycarbonate lens with soap and water to remove residual sand from the coated lens, the percent haze of this coated lens is measured with the Haze-Gard Plus. Examples described herein refer to an "increase in haze" after the falling sand abrasion test. This "increase in haze" is the arithmetic difference between the percent haze measurement taken after the falling sand test and the initial haze percent measurement, i.e., increase in haze=[(percent haze after falling sand test)−(initial percent haze)].

List of Materials and/or Abbreviations Used in the Following Examples:

2-dimethylamine-2-methylpropan-1-ol: An amine salt having an isocyanate reactive hydroxyl group.

Aqueous amine oxide surfactant solution: A N,N-Dimethyldodecylamine N-oxide solution (about 30% or greater solution of active amine oxide in water), commercially available from Sigma-Aldrich Corp. of St. Louis, Mo.

Aqueous betaine surfactant solution: A N,N-Dimethyl-N-dodecylglycine betaine surfactant solution (about 35% active alkyl betaine in water), commercially available as EMPIGEN® BB detergent from Sigma-Aldrich Corp. of St. Louis, Mo.

Cirrasol G-265: A quaternary ammonium surfactant having two polyethylene oxide side chains and the hydrophobic chain containing stearamide functionality commercially available from Uniquema Co. of Chicago, Ill.

Sodium dioctylsulfosuccinate: A non-reactive anionic surfactant salt, commercially available for example from Cytec Industries, Inc. of Woodland Park, N.J.

DMAMP DBS solution: A 2-dimethylamine-2-methylpropan-1-ol salt of dodecylbenzene sulfonic acid solution (86% in xylene).

IPDI: An isophorone diisocyanate, commercially available as VESTANAT® IPDI from Evonik Degussa Gmbh. of Germany.

PC 2000: A polyhexamethylene carbonate diol with a $M_W$ of about 2000, commercially available from Sigma-Aldrich Corp. of St. Louis, Mo.

PEG 1000: A polyethylene glycol with an average $M_n$ of about 1,000, commercially available from Sigma-Aldrich Corp. of St. Louis, Mo.

PEO side-chained diol: A diol with an average $M_n$ of about 1275 having polyethylene oxide side chains. The polyethylene oxide comprises about 78% by weight of this diol. This polyol is a reaction product of a two step reaction in which a hexamethylene diioscyanate is reacted with a mono-methyoxy-polyethylene glycol of having an $M_n$, of about 1,000. The mono-functional mono-methyoxy-polyethylene-glycol reacts with one isocyanate functional group of the diisocyanate, and the residual isocyanate functional group is reacted with a diethanolamine to result in this diol compound having polyethylene oxide side chains.

Pluronic L-62: A polyethylene oxide and polypropylene oxide block copolymer diol with a $M_w$ of about 2100. The block copolymer comprises polyethylene oxide segments only in the main chain or backbone of the block copolymer diol. The polyethylene oxide segments comprise about 17% (wt) of the block copolymer diol. Pluronic L-62 is commercially available from BASF Corp of Germany.

Poly G 83-34: A polyethylene oxide and polypropylene oxide copolymer triol with a $M_w$ of about 5000. The copolymer triol comprises 80% (wt) polyethylene oxide and 20% (wt) polypropylene oxide. The Poly G 83-34 is commercially available from Arch Chemicals, Inc. of Norwalk, Conn.

PTF 1000: A poly(1,4-butanediol), i.e., a poly(tetrahydrofuran) with an average $M_n$, of about 1,000, commercially available from Sigma-Aldrich Corp. of St. Louis, Mo.

Quaternary amine surfactant solution: A hexadecyltrimethylammonium hydroxide solution (10% active amine surfactant in water), commercially available from Tokyo Chemical Industry Co., Ltd. of Japan.

Tegomer D3403: A trimethylol propane monoethoxylate methyl ether with an average $M_n$, of about 1,220, commercially available from Evonik Degussa Gmbh. of Germany.

Tin catalyst: A tin(II)-ethylhexanoate catalyst, commercially available from Sigma-Aldrich Corp. of St. Louis, Mo.

Triton X-165: An aqueous non-ionic polyethylene glycol ether surfactant solution (70%), commercially available from Sigma-Aldrich Corp. of St. Louis, Mo.

Trixene DP9C/012: A triisocyanate partially blocked with a 3,5-dimethylpyrazole blocking agent. Trixene DP9C/012 is commercially available in a propylene glycol monomethyl ether acetate (PM acetate) solution comprising 70% solids content from Baxenden Chemicals Ltd. of the United Kingdom.

Trixene BI 7961: An HDI biuret blocked with a 3,5-dimethylpyrazole blocking agent. Trixene BI 7961 is commercially available in a light aromatic hydrocarbon solvent (naptha solvent) comprising about from 68% to about 72% solids content from Baxenden Chemicals Ltd. of the United Kingdom.

EXAMPLES

Example 1

Preparation of an Aqueous Polyurethane Dispersion with an Amphoteric Surfactant 21.1 grams (g) of IPDI, 28.2 g of PC 2000, 2.1 g of trimethylolpropane, 3.2 g of dimethylolpropionic acid, 8.1 g of Tegomer D3403, and 35 g of methylethylketone are mixed together. The mixture is heated to 70° C., and 0.01 g of tin catalyst is added. The mixture is then reacted for 3 hours in a nitrogen environment. After the reaction finishes, the resulting polyurethane prepolymer mixture is cooled to 40° C. 40.3 g polyurethane prepolymer mixture is then dispersed into 51.2 g of water and 7.0 g of aqueous betaine surfactant solution with a high shear disperser. 0.25 g of hydrazine-monohydrate and 0.58 g of 1,6-hexanediamine are also added during dispersion with the high shear disperser, resulting in an aqueous polyurethane dispersion having about 27% solids by weight of the dispersion. The resulting polyurethane comprises about 10% polyethylene oxide side chains by weight of the solids of the polyurethane and about 10% neutralized amines by weight of the solids of the polyurethane.

The measured viscosity of the aqueous polyurethane dispersion is 34 centiPoise (cps) at 25° C. A polycarbonate lens is dip-coated in the aqueous polyurethane dispersion at a 12 inch/min draw speed. The dip-coated lens is dried for 30 min at room temperature. This drying results in the coating being tack-free. The coated lens then is cured at 90° C. for 2 hours. The resulting coated lens has a coating thickness of about 14.2 micrometers (μm). Haze is about 0.30% for the initial haze test and about 0.21% after soaking in water for 1 hour. The increase in haze after the falling sand abrasion test is about 12.8%. The coated lens also passes each of the adhesion test, the initial anti-fogging test, and the anti-fogging after soaking for 1 hour test, i.e., the coated lens remains fog-free for at least 8 seconds after having soaked the coated lens in water for 1 hour (in accordance with EN166/EN168 specifications).

Example 2

Preparation of an Aqueous Polyurethane Dispersion with an Amphoteric Surfactant 24.7 g of IPDI, 14.7 g of PC 2000, 3.2 g of trimethylolpropane, 3.0 g of dimethylolpropionic acid, 15.3 g of PEO-side chained diol, 1.9 g of PTF 1000, and 35 g of acetonitrile are mixed together. The mixture is heated to 70° C., and 0.01 g of tin catalyst is added. The mixture is then reacted for 3 hours in a nitrogen environment. After the reaction finishes, the resulting polyurethane prepolymer mixture is cooled to 40° C. 40.9 g of polyurethane prepolymer mixture is then dispersed into 51.2 g of water and 7.4 g of aqueous amine oxide surfactant solution with a high shear disperser. 0.55 g of hydrazine-monohydrate is also added during dispersion with the high shear disperser, resulting in an aqueous polyurethane dispersion having about 28% solids by weight of the dispersion. The resulting polyurethane comprises about 17% polyethylene oxide side chains by weight of the solids of the polyurethane and about 8% neutralized amines by weight of the solids of the polyurethane.

The measured viscosity of the aqueous polyurethane dispersion is 39 cps at 25° C. A polycarbonate lens is dip-coated in the aqueous polyurethane dispersion at a 12 inch/min draw speed. The dip-coated lens is dried for 30 min at room temperature. This drying results in the coating being tack-free. The coated lens then is cured at 90° C. for 2 hours. The resulting coated lens has a coating thickness of about 11.5 μm. Haze is about 0.24% for the initial haze test and about 0.60% after soaking in water for 1 hour. The increase in haze after the falling sand abrasion test is about 15.2%. The coated lens also passes each of the adhesion test, the initial anti-fogging test, and the anti-fogging after soaking for 1 hour test, i.e., fog-free for at least 8 seconds (EN166/EN168).

Example 3

Preparation of an Aqueous Polyurethane Dispersion with an Amphoteric Surfactant 22.0 g of IPDI, 20.2 g of PC 2000, 2.1 g of trimethylolpropane, 3.2 g of dimethylolpropionic acid, 9.1 g of PEO-side chained diol, 5.9 g of PEG 1000, and 35 g of methylethylketone are mixed together. The mixture is heated to 70° C., and 0.01 g of tin catalyst is added. The mixture is then reacted for 3 hours in a nitrogen environment. After the reaction finishes, the resulting polyurethane prepolymer mixture is cooled to 40° C. 37.2 g of polyurethane prepolymer mixture is then dispersed into 53.3 g of water and 7.3 g of aqueous amine oxide surfactant solution with a high shear disperser. 0.25 g of hydrazine-monohydrate and 0.59 g of 1,6-hexanediamine are also added during dispersion with the high shear disperser, resulting in an aqueous polyurethane dispersion having about 27% solids by weight of the dispersion. The resulting polyurethane comprises about 10% polyethylene oxide side chains by weight of the solids of the polyurethane, about 10% polyethylene oxide main chains by weight of the solids of the polyurethane, and about 8% neutralized amines by weight of the solids of the polyurethane.

The measured viscosity of the aqueous polyurethane dispersion is 63 cps at 25° C. A polycarbonate lens is dip-coated in the aqueous polyurethane dispersion at a 12 inch/min draw speed. The dip-coated lens is dried for 30 min at room temperature. This drying results in the coating being tack-free. The coated lens then is cured at 90° C. for 2 hours. The resulting coated lens has a coating thickness of about 11.0 µm. Haze is about 0.30% for the initial haze test and about 0.42% after soaking in water for 1 hour. The increase in haze after the falling sand abrasion test is about 16.3%. The coated lens also passes each of the adhesion test, the initial anti-fogging test, and the anti-fogging after soaking for 1 hour test, i.e., fog-free for at least 8 seconds (EN166/EN168).

Example 4

Preparation of an Aqueous Polyurethane Dispersion with an Amphoteric Surfactant and Blocked Polyisocyanates 21.8 g of IPDI, 19.0 g of PC 2000, 2.1 g of trimethylolpropane, 3.2 g of dimethylolpropionic acid, 9.1 g of PEO-side chained diol, 5.9 g of PEG 1000, and 35 g of methylethylketone are mixed together. The mixture is heated to 70° C., and 0.01 g of tin catalyst is added. The mixture is then reacted for 3 hours in a nitrogen environment. The resulting polyurethane prepolymer mixture is cooled to 40° C., and 1.4 g of Trixene BI 7961 is added to the mixture. 37.1 g of the resulting polyurethane prepolymer mixture is then dispersed into 53.4 g of water and 7.3 g of aqueous amine oxide surfactant solution with a high shear disperser. 0.25 g of hydrazine-monohydrate and 0.59 g of 1,6-hexanediamine are also added during dispersion with the high shear disperser, resulting in an aqueous polyurethane dispersion having about 25% solids by weight of the dispersion. The resulting polyurethane comprises about 10% polyethylene oxide side chains by weight of the solids of the polyurethane, about 10% polyethylene oxide main chains by weight of the solids of the polyurethane, about 1.7% blocked isocyanates by weight of the solids of the polyurethane, and about 8% neutralized amines by weight of the solids of the polyurethane.

The measured viscosity of the aqueous polyurethane dispersion is 47 cps at 25° C. A polycarbonate lens is dip-coated in the aqueous polyurethane dispersion at a 12 inch/min draw speed. The dip-coated lens is dried for 30 min at room temperature. This drying results in the coating being tack-free. The coated lens then is cured at 90° C. for 2 hours. The resulting coated lens has a coating thickness of about 8.5 µm. Haze is about 0.14% for the initial haze test and about 0.30% after soaking in water for 1 hour. The increase in haze after the falling sand abrasion test is about 10.7%. The coated lens also passes each of the adhesion test, the initial anti-fogging test, and the anti-fogging after soaking for 1 hour test, i.e., fog-free for at least 8 seconds (EN166/EN168).

Example 5

Preparation of a Polyurethane Mixture with an Isocyanate-Reactive Salt of a Surfactant and Partially Blocked Polyisocyanates 24.7 g Trixene DP9C/012, 4.2 g Poly G 83-34, 1.1 g Pluronic L-62, 0.5 g trimethylolethane, 0.6 g triethanolamine, and 5.0 g DMAMP DBS solution (86% in xylene) are added to 4.1 g N-methyl pyrrolidone, 4.5 g tertiary amyl alcohol, 7.9 g methylethylketone, and 0.9 g 2,4-pentanedione and mixed together. The mixture is heated to 60° C. and then reacted for 8 hours in a nitrogen environment. Following the reaction, the resulting polyurethane prepolymer mixture is cooled to 30° C. The cooled polyurethane prepolymer mixture fails to disperse in water. The resulting polyurethane comprises about 3% polyethylene oxide side chains by weight of the solids of the polyurethane, about 10% polyethylene oxide main chains by weight of the solids of the polyurethane, and about 44% blocked polyisocyanates by weight of the solids of the polyurethane.

Example 6

Preparation of an Aqueous Polyurethane Dispersion with a Isocyanate-Reactive Cationic Surfactant and Partially Blocked Polyisocyanates 19.5 g Trixene DP9C/012, 1.2 g PEG 1000, 4.6 g PC 2000, 0.6 g trimethylolpropane, 3.8 g Tegomer D3403, 1.2 g Cirrasol G-265, and 0.002 g tin catalyst are added to 4.0 g methylethylketone and 2.8 g diacetone alcohol and are mixed together. The mixture is heated to 60° C. and then reacted for 6 hours in a nitrogen environment. Following the reaction, the resulting polyurethane prepolymer mixture is cooled to 30° C. The polyurethane prepolymer mixture is then dispersed in 63.0 g of distilled water, 0.34 g 1,6-hexanediamine, and 0.15 g 30% aqueous hydrazine with a high shear disperser, resulting in a stable aqueous polyurethane dispersion having about 24% solids by weight of the dispersion. The resulting polyurethane comprises about 6% polyethylene oxide side chains by weight of the solids of the polyurethane, about 14.6% polyethylene oxide main chains by weight of the solids of the polyurethane, and about 36.2% blocked polyisocyanates by weight of the solids of the polyurethane.

The measured viscosity of the aqueous polyurethane dispersion is 37 cps at 25° C. A polycarbonate lens is dip-coated in the aqueous polyurethane dispersion at a 12 inch/min draw speed. The dip-coated lens is cured at 120° C. for 1 hour resulting in a coating with a thickness of about 7.9 µm. Haze is about 0.8% for the initial haze test. The haze is about 1.1% after soaking in water for 1 hour and remains clear at this 1.1% haze. The increase in haze after the falling sand abrasion test is about 5.5%. The polyurethane coated lens dip-coated with the aqueous polyurethane dispersion also passes each of the adhesion test and the initial anti-fogging test. However, the coated lens fails the anti-fogging after soaking for 1 hour test, i.e., not fog-free for at least 8 seconds. This polyurethane coating exhibits resistance to washing by chemicals such as separate washing by each of isopropyl alcohol, toluene, and methylethylketone.

Example 7

Preparation of an Aqueous Polyurethane Dispersion with a Isocyanate-Reactive Cationic Surfactant and Partially Blocked Polyisocyanates 4.6 g IPDI, 5.5 g DP9C/012, 7.8 g PC 2000, 0.7 g trimethylolpropane, 3.2 g PEO-side chained diol, 2.1 g Cirrasol G-265, and 0.011 g tin catalyst are added to 10.3 g N-methyl pyrrolidone and 2.2 g diacetone alcohol and are mixed together. The mixture is heated to 65° C. and then reacted for 3 hours in an inert atmosphere. Following the reaction, the resulting polyurethane prepolymer mixture is cooled to 40° C. The cooled polyurethane prepolymer mixture is then dispersed in 66.6 g of distilled water and 0.65 g 2-(2-aminoethyl) aminoethanol with a high shear disperser, resulting in a stable aqueous polyurethane dispersion having about 24% solids by weight of the dispersion. The resulting polyurethane comprises about 11% polyethylene oxide side chains by weight of the solids of the polyurethane, about 2% polyethylene oxide main chains by weight of the solids of the polyurethane, and about 11.7% blocked polyisocyanates by weight of the solids of the polyurethane.

The measured viscosity of the aqueous polyurethane dispersion is 54 cps at 25° C. A polycarbonate lens is dip-coated in the aqueous polyurethane dispersion at a 12 inch/min draw speed. The dip-coated lens is cured at 120° C. for 1 hour resulting in a coating with a thickness of about 8.1 μm. Haze is about 0.18% for the initial haze test and about 0.25% after soaking in water for 1 hour. The increase in haze after the falling sand abrasion test is about 1.0%. The polyurethane coated lens dip-coated with the aqueous polyurethane dispersion also passes the adhesion test. However, the coated lens fails the initial anti-fogging test and the anti-fogging after soaking for 1 hour test, i.e., not fog-free for at least 8 seconds. This polyurethane coating exhibits resistance to washing by chemicals such as isopropyl alcohol but does not show resistance to separate washing by each of tolulene or methylethylketone.

Example 8

Preparation of an Aqueous Polyurethane Dispersion with an Isocyanate-Reactive Salt of a Surfactant, an Isocyanate-Reactive Cationic Surfactant, and Partially Blocked Polyisocyanates 22.4 g DP9C/012, 3.9 g Poly G 83-34, 1.0 g Pluronic L-62, 0.4 g trimethylolethane, 2.0 g Cirrasol G-265, 1.0 g DMAMP DBS, and 0.11 g tin catalyst are added to 2.6 g N-methyl pyrrolidone plus 4.7 g methylethylketone, 2.8 g tertiary amyl alcohol, 0.6 g 2,4-pentanedione and 4.0 g diacetone alcohol and are mixed together. The mixture is heated to 60° C. and then reacted for 6 hours in a nitrogen atmosphere. Following the reaction, the resulting polyurethane prepolymer mixture is cooled and then dispersed in 59.0 g of distilled water, 0.1 g trimethylolethane, and 0.2 g triethanolamine with a high shear disperser, resulting in a stable aqueous polyurethane dispersion having about 24% solids by weight of the dispersion. The resulting polyurethane comprises about 3% polyethylene oxide side chains by weight of the solids of the polyurethane, about 12% polyethylene oxide main chains by weight of the solids of the polyurethane, and about 48% blocked polyisocyanates by weight of the solids of the polyurethane.

The measured viscosity of the aqueous polyurethane dispersion is 32 cps at 25° C. A polycarbonate lens is dip-coated in the aqueous polyurethane dispersion at a 12 inch/min draw speed. The dip-coated lens is cured at 120° C. for 1 hour resulting in a coating with a thickness of about 12.1 μm. Haze is about 0.17% for the initial haze test and about 0.58% after soaking in water for 1 hour. The increase in haze after the falling sand abrasion test is about 1.7%. The coated lens also passes each of the adhesion test, the initial anti-fogging test, and the anti-fogging after soaking for 1 hour test, i.e., fog-free for at least 8 seconds (EN166/EN168). This polyurethane coated lens also does not fog when exposed to the water vapor in excess of 30 seconds (ASTM F659), in excess of 60 seconds, or in excess of 900 seconds. This polyurethane coating exhibits resistance to washing by chemicals such as separate washing by each of isopropyl alcohol, tolulene, and methylethylketone.

Example 9

Preparation of an Aqueous Polyurethane Dispersion with an Isocyanate-Reactive Salt of Surfactant, a Isocyanate-Reactive Cationic Surfactant, a Non-Reactive Anionic Surfactant, and Partially Blocked Polyisocyanates 3.1 g IPDI, 3.6 g DP9C/012, 3.0 g PC 2000, 0.3 g trimethylolpropane, 2.3 g PEO side-chained diol, 1.0 g Poly G 83-34, 1.3 g Cirrasol G-265, 0.7 g DMAMP DBS solution, 0.9 g sodium dioctylsulfosuccinate, and 0.011 g tin catalyst are added to 5.1 g N-methyl pyrrolidone and 2.2 g diacetone alcohol and are mixed together. The mixture is heated to 65° C. and then reacted for 3 hours in an inert atmosphere. Following the reaction, the resulting polyurethane prepolymer mixture is cooled to 40° C. The cooled polyurethane prepolymer mixture is then dispersed in 75.7 g of distilled water and 0.4 g 2-(2-aminoethyl)aminoethanol with a high shear disperser, resulting in a stable aqueous polyurethane dispersion having about 16% solids by weight of the dispersion. The resulting polyurethane comprises about 12% polyethylene oxide side chains by weight of the solids of the polyurethane, about 6% polyethylene oxide main chains by weight of the solids of the polyurethane, and about 11% blocked polyisocyanates by weight of the solids of the polyurethane.

The measured viscosity of the aqueous polyurethane dispersion is 29 cps at 25° C. A polycarbonate lens is dip-coated in the aqueous polyurethane dispersion at a 12 inch/min draw speed. The dip-coated lens is cured at 120° C. for 1 hour resulting in a coating with a thickness of about 8.3 μm. Haze is about 0.25% for the initial haze test and about 0.23% after soaking in water for 1 hour. The increase in haze after the falling sand abrasion test is about 1.2%. The coated lens passes each of the adhesion test, the initial anti-fogging test, and the anti-fogging after soaking for 1 hour test, i.e., fog free for at least 8 seconds (EN166/EN168). This polyurethane coated lens does not fog when exposed to the water vapor in excess of 30 seconds (ASTM F659), in excess of 60 seconds, or in excess of 900 seconds. This polyurethane coating exhibits resistance to washing by chemicals such as separate washing by each of isopropyl alcohol, tolulene, and methylethylketone.

Example 10

Preparation of an Aqueous Polyurethane Dispersion from the Combination of the Aqueous Polyurethane Dispersion of Example 3 and the Aqueous Polyurethane Dispersion of Example 8

100 g of the aqueous polyurethane dispersion from Example 8 is mixed with 100 g of the aqueous polyurethane dispersion from Example 3, producing an aqueous polyurethane dispersion containing 25% solids by weight of the dispersion. To reduce viscosity, an additional 100 g water is added with agitation, resulting in a stable, hazy aqueous polyurethane dispersion having about 17% solids by weight of the dispersion. The resulting polyurethane comprises about 6.7% polyethylene oxide side chains by weight of the solids of the polyurethane, about 10.9% polyethylene oxide main chains by weight of the solids of the polyurethane, about 4.2% neutralized amines by weight of the solids of the polyurethane, and about 22.6% blocked polyisocyanates by weight of the solids of the polyurethane.

A polycarbonate lens is dip-coated in the aqueous polyurethane dispersion at a 12 inch/min draw speed. The dip-coated lens is dried at room temperature for 5 minutes and then is dried at 85° C. for an additional 10 minutes. The coating on the lens is tack-free following the drying at 85° C. The tack-free coated lens is cured at 120° C. for 1 hour resulting in a coating with a thickness of about 8.1 μm.

The increase in haze after the falling sand abrasion test is about 3.2%. In a separate test, the coated lens also exhibits little increase in haze when exposed to boiling water for two hours. The coated lens also passes each of the adhesion test, the initial anti-fogging test, and the anti-fogging after soaking for 1 hour test, i.e., fog free for at least 8 seconds (EN166/EN168). This polyurethane coated lens also does not fog when exposed to the water vapor in excess of 30 seconds (ASTM F659), in excess of 60 seconds, or in excess of 7200 seconds (2 hours), both before and after soaking in water for 1 hour. Additionally, the coated lens does not fog when exposed to the water vapor in excess of 30 seconds, in excess of 60 seconds, or in excess of 7200 seconds after soaking in water for 24 hours (followed by a 12 hour recovery period). This polyurethane coating exhibits resistance to washing by chemicals such as separate washing by each of isopropyl alcohol, diacetone alcohol, and methylethylketone.

Example 11

Preparation of a Mixture of an Aqueous Polyurethane Dispersion and an Organic Solvent Polyurethane Solution from the Combination of the Prepolymer of Example 3 and the Prepolymer of Example 8 with an Amphoteric Surfactant 50 g of the prepolymer of Example 3 and 50 g of the prepolymer of Example 8 are mixed together and are added to a mixture of 93 g 1-methoxy-2-propanol and 93 g water. 5.8 g aqueous amine oxide surfactant solution, 0.20 g hydrazine monohydrate, and 0.47 g hexanediamine chain extenders are added to the prepolymer mixture with agitation resulting in a hazy aqueous polyurethane dispersion and an organic solvent polyurethane solution mixture. The resulting polyurethane mixture has a solid content of about 20% by weight of the polyurethane mixture. The resulting polyurethane comprises about 8.2% polyethylene oxide side chains by weight of the solids of the polyurethane, about 10.3% polyethylene oxide main chains by weight of the solids of the polyurethane, about 2.9% neutralized amines by weight of the solids of the polyurethane, and about 20.4% blocked polyisocyanates by weight of the solids of the polyurethane.

A polycarbonate lens is dip-coated in the aqueous polyurethane dispersion at a 12 inch/min draw speed. The dip-coated lens is dried at room temperature for 5 minutes and then is dried at 85° C. for an additional 10 minutes. The coating on the lens is tack-free following the drying at 85° C. The tack-free coated lens is cured at 120° C. for 1 hour resulting in a coating thickness of about 6.9 μm. This coated lens performs the same as the coated lens described in Example 10 with respect to haze, fogging, abrasion, adhesion, and resistance to chemicals.

Example 12

Preparation of an Organic Solvent Polyurethane Solution from the Combination of the Prepolymer of Example 3 and the Prepolymer of Example 8

50 g of the prepolymer of Example 3 and 50 g of the prepolymer of Example 8 are mixed together and are added to 185.5 g 1-methoxy-2-propanol with agitation, resulting in a homogenous, clear polyurethane solution. The resulting polyurethane solution comprises essentially all non-aqueous solvents, i.e., the solution is essentially free of water. The polyurethane solution has about 20% solids by weight of the solution. The resulting polyurethane comprises about 9.0% polyethylene oxide side chains by weight of the solids of the polyurethane, about 11.5% polyethylene oxide main chains by weight of the solids of the polyurethane, and about 22.6% blocked polyisocyanates by weight of the solids of the polyurethane.

The measured viscosity of the organic solvent polyurethane solution is about 25 cps at 25° C. After vigorous shaking of the a sample of this solution, no foaming is observed in the sample. A polycarbonate lens is dip-coated in the polyurethane solution at a 12 inch/min draw speed. The dip-coated lens is dried at room temperature for 5 minutes and then is dried at 85° C. for an additional 10 minutes. The coating on the lens is tack-free following the drying at 85° C. The tack-free coated lens is cured at 120° C. for 1 hour resulting in a coating with a thickness of about 5.8 μm. This coated lens performs substantially the same as the coated lens described in Example 10 with respect to haze, fogging, abrasion, adhesion, and resistance to chemicals.

Comparative Example 1

Preparation of an Aqueous Polyurethane Dispersion 23.3 g of IPDI, 7.1 g of PC 2000, 2.1 g of trimethylolpropane, 29.6 g of Tegomer D3403, 2.8 g of 1,6-hexanediol, and 35 g of acetonitrile are mixed together. The mixture is heated to 70° C., and 0.01 g of tin catalyst is added. The mixture is then reacted for 3 hours in a nitrogen environment. After the reaction finishes, the resulting polyurethane prepolymer mixture is cooled to 40° C. 45.2 g of the cooled polyurethane prepolymer mixture is dispersed in 51.7 g of water with a high shear disperser. 0.62 g of hydrazine-monohydrate is also added during dispersion with the high shear disperser, resulting in an aqueous polyurethane dispersion having about 30% solids by weight of the dispersion. The resulting polyurethane comprises about 40% polyethylene oxide side chains by weight of the solids of the polyurethane.

The measured viscosity of the aqueous polyurethane dispersion is 70 cps at 25° C. A polycarbonate lens is dip-coated in the aqueous polyurethane dispersion at a 12 inch/min draw speed. The dip-coated lens is dried for 30 min at room temperature and then is cured at 90° C. for 2 hours. The resulting coated lens has a coating thickness of about 18.0 μm. Haze is about 0.80% for the initial haze test. The coated lens cannot be seen through after soaking in water for 1 hour and has a haze of about 75.0%. The haze is not measured after the falling sand abrasion test because all of the sand could not be washed off the coated lens. This polyurethane coated lens fails both the initial anti-fogging test and the anti-fogging test after soaking in water for 1 hour because fog is observed on this polyurethane coated lens during each test. This coated lens passes the adhesion test.

Comparative Example 2

Preparation of an Aqueous Polyurethane Dispersion 22.9 g of IPDI, 14.5 g of PC 2000, 2.2 g of trimethylolpropane, 22.6 g of Tegomer D3403, 2.9 g of 1,6-hexanediol, and 35 g of acetonitrile are mixed together. The mixture is heated to 70° C., and 0.01 g of tin catalyst is added. The mixture is then reacted for 3 hours in a nitrogen environment. After the reaction finishes, the resulting polyurethane prepolymer mixture is cooled to 40° C. 45.2 g of the cooled polyurethane prepolymer mixture is dispersed in 51.7 g of water with a high shear disperser. 0.62 g of hydrazine-monohydrate is also added during dispersion with the high shear disperser, resulting in an aqueous polyurethane dispersion having about 30% solids by weight of the dispersion. The resulting polyurethane comprises about 31% polyethylene oxide side chains by weight of the solids of the polyurethane.

The measured viscosity of the aqueous polyurethane dispersion is 72 cps at 25° C. A polycarbonate lens is dip-coated in the aqueous polyurethane dispersion at a 12 inch/min draw speed. The dip-coated lens is dried for 30 min at room temperature and then is cured at 90° C. for 2 hours. The resulting coated lens has a coating thickness of about 19.0 μm. Haze is about 0.66% for the initial haze test. The coated lens cannot be seen through after soaking in water for 1 hour and has a haze of about 37.0%. The haze is not measured after the falling sand abrasion test because all of the sand could not be washed off the coated lens. This polyurethane coated lens fails both the initial anti-fogging test and the anti-fogging after soaking for 1 hour test because fog is observed on this polyurethane coated lens during each test. This coated lens passes the adhesion test.

Comparative Example 3

Preparation of an Aqueous Polyurethane Dispersion 22.2 g of IPDI, 22.8 g of PC 2000, 2.1 g of trimethylolpropane, 15.0 g of Tegomer D3403, 2.8 g of 1,6-hexanediol, and 35 g of acetonitrile are mixed together. The mixture is heated to 70° C., and 0.01 g of tin catalyst is added. The mixture is then reacted for 3 hours in a nitrogen environment. After the reaction finishes, the resulting polyurethane prepolymer mixture is cooled to 40° C. 45.2 g of the cooled polyurethane prepolymer mixture is dispersed in 51.8 g of water with a high shear disperser. 0.60 g of hydrazine-monohydrate is also added during dispersion with the high shear disperser, resulting in an aqueous polyurethane dispersion having about 30% solids by weight of the dispersion. The resulting polyurethane comprises about 20% polyethylene oxide side chains by weight of the solids of the polyurethane.

The measured viscosity of the aqueous polyurethane dispersion is 60 cps at 25° C. A polycarbonate lens is dip-coated in the aqueous polyurethane dispersion at a 12 inch/min draw speed. The dip-coated lens is dried for 30 min at room temperature and then is cured at 90° C. for 2 hours. The resulting coated lens has a coating thickness of about 10.6 μm. Haze is about 0.22% for the initial haze test. The haze is about 1.3% after soaking in water for 1 hour and is visible on the coated lens. The increase in haze after the falling sand abrasion test is about 32.8%. The coated lens passes each of the adhesion test and the anti-fogging after soaking for 1 hour test, i.e., fog-free for at least 8 seconds (EN166/EN168). However, this coated lens fails the initial anti-fogging test with visible fog on the lens appearing during the 3 minutes of the test.

Comparative Example 4

Preparation of a Polyurethane Mixture 21.6 g of IPDI, 31.0 g of PC 2000, 2.1 g of trimethylolpropane, 7.4 g of Tegomer D3403, 2.8 g of 1,6-hexanediol, and 35 g of acetonitrile are mixed together. The mixture is heated to 70° C., and 0.01 g of tin catalyst is added. The mixture is then reacted for 3 hours in a nitrogen environment. After the reaction finishes, the resulting polyurethane mixture is cooled to 40° C. 45.2 g of the cooled polyurethane mixture fails to disperse in 51.8 g of water with a high shear disperser. The resulting polyurethane comprises about 10% polyethylene oxide side chains by weight of the solids of the polyurethane.

Comparative Example 5

Preparation of a Polyurethane Mixture with Cationic Surfactant 25.4 g of IPDI, 24.8 g of PC 2000, 0.5 g of trimethylolpropane, 4.0 g of dimethylolpropionic acid, 9.9 g of Tegomer D3403, 2.5 g of 1,6-hexanediol, and 30 g of acetonitrile are mixed together. The mixture is heated to 70° C., and 0.01 g of tin catalyst is added. The mixture is then reacted for 3 hours in a nitrogen environment. After the reaction finishes, the resulting polyurethane mixture is cooled to 40° C. 27.9 g of the cooled polyurethane mixture fails to disperse into a mixture of 47.4 g of water and 24.8 g of quaternary amine surfactant solution with high shear disperser. The resulting polyurethane comprises about 12% polyethylene oxide side chains by weight of the solids of the polyurethane and about 10% neutralized amine by weight of the solids of the polyurethane.

Comparative Example 6

Preparation of an Aqueous Polyurethane Dispersion 21.8 g of IPDI, 27.2 g of PC 2000, 2.1 g of trimethylolpropane, 11.1 g of Tegomer D3403, 2.8 g of 1,6-hexanediol, and 35 g of acetonitrile are mixed together. The mixture is heated to 70° C., and 0.01 g of tin catalyst is added. The mixture is then reacted for 3 hours in a nitrogen environment. After the reaction finishes, the resulting polyurethane prepolymer mixture is cooled to 40° C. 45.2 g of the cooled polyurethane prepolymer mixture is dispersed in 51.8 g of water with a high shear disperser. 0.60 g of hydrazine-monohydrate is also added during dispersion with the high shear disperser, resulting in an aqueous polyurethane dispersion having about 30% solids by weight of the dispersion. The resulting polyurethane comprises about 15% polyethylene oxide side chains by weight of the solids of the polyurethane.

The measured viscosity of the aqueous polyurethane dispersion is 50 cps at 25° C. A polycarbonate lens is dip-coated in the aqueous polyurethane dispersion at a 12 inch/min draw speed. The dip-coated lens is dried for 30 min at room temperature and then is cured at 90° C. for 2 hours. The resulting coated lens has a coating thickness of about 8.6 μm. Haze is about 0.30% for the initial haze test and 0.52% after soaking in water for 1 hour. The increase in haze after the falling sand abrasion test is about 19.8%. This polyurethane coated lens fails both the initial anti-fogging test and the anti-fogging after soaking for 1 hour test because fog is observed on this polyurethane coated lens during each test. This coated lens passes the adhesion test.

Comparative Example 7

Preparation of an Aqueous Polyurethane Dispersion with a Non-Reactive Surfactant 103 g of the aqueous polyurethane dispersion of Comparative Example 6 is mixed with 4 g of Triton X-165. A polycarbonate lens is dip-coated in the aqueous polyurethane dispersion at a 12 inch/min draw speed. The dip-coated lens dries for 30 min at room temperature and then is cured at 90° C. for 2 hours. The resulting coated lens has a coating thickness of about 8.6 µm. The coated lens passes the adhesion test and the initial anti-fogging test. This polyurethane coated lens however fails the anti-fogging after soaking for 1 hour test because this coated lens fogs within the 8 seconds of exposing it to the 50° C. water vapors.

It will be understood that various changes may be made without departing from the scope of the invention, which is not to be considered limited to what is described in the description.

What is claimed is:

1. A coating composition that provides a transparent, abrasion-resistant, water-washable anti-fog coating when applied to a substrate and cured, comprising:
    (A) a first mixture comprising a first polyurethane and a first liquid phase selected from the group consisting of water, an organic solvent, and combinations thereof, wherein the first polyurethane comprises the reaction products of:
        (i) a first polyol component and at least one additional polyol component different than the first polyol component, wherein the first polyol component comprises a diol having polyethylene oxide side chain segments,
        (ii) a first polyisocyanate component comprising at least one polyisocyanate selected from the group consisting of diisocyanates, triisocyanates, derivatives of diisocyanates and triisocyanates capable of forming polyurethane linkages, and combinations thereof, and
        (iii) a dihydroxy-carboxylic acid neutralized by a carboxylic-reactive amphoteric surfactant to form a salt of the amphoteric surfactant,
    wherein the first polyurethane includes hydrophilic side chain segments in an amount ranging from about 0.01% to about 20% by weight of the solids of the first polyurethane; or
    (B) a second mixture comprising a second polyurethane and a second liquid phase selected from the group consisting of water, an organic solvent, and combinations thereof, wherein the second polyurethane comprises the reaction products of:
        (i) a second polyol component and at least one additional polyol component different than the second polyol component, wherein the second polyol component comprises at least one of:
            (a) a diol having main chain segments selected from the group consisting of polyethylene oxide, polypropylene oxide, and combinations thereof, or
            (b) a triol having main chain segments selected from the group consisting of polyethylene oxide, polypropylene oxide, and combinations thereof,
        (ii) a second polyisocyanate component comprising at least one partially blocked tri-functional polyisocyanate,
        (iii) an isocyanate-reactive salt of a surfactant, and
        (iv) an isocyanate-reactive cationic surfactant,
    wherein the second polyurethane includes hydrophilic main chain segments in an amount ranging from about 0.01% to about 20% by weight of the solids of the second polyurethane; or
    (C) a third mixture comprising a third polyurethane and a third liquid phase selected from the group consisting of water, an organic solvent, and combinations thereof, wherein the third polyurethane comprises the reaction products of:
        (i) a third polyol component and at least one additional polyol component different than the third polyol component, wherein the third polyol component comprises a diol having polyethylene oxide side chain segments and at least one of:
            (a) a diol having main chain segments selected from the group consisting of polyethylene oxide, polypropylene oxide, and combinations thereof, or
            (b) a triol having main chain segments selected from the group consisting of polyethylene oxide, polypropylene oxide, and combinations thereof,
        (ii) a third polyisocyanate component comprising:
            (a) at least one polyisocyanate selected from the group consisting of diisocyanates, triisocyanates, derivatives of diisocyanates and triisocyanates capable of forming polyurethane linkages, and combinations thereof, and
            (b) at least one partially blocked tri-functional polyisocyanate,
        (iii) an isocyanate-reactive salt of a surfactant, and
        (iv) an isocyanate-reactive cationic surfactant,
    wherein the third polyurethane includes hydrophilic main chain segments, hydrophilic side chain segments, or combinations thereof in an amount ranging from about 0.01% to about 40% by weight of the solids of the third polyurethane.

2. The composition of claim 1, wherein the hydrophilic side chain segments comprise polyethylene oxide.

3. The composition of claim 1, wherein the hydrophilic main chain segments are selected from the group consisting of polyethylene oxide, polypropylene oxide, and combinations thereof.

4. The composition of claim 1, wherein the at least one additional polyol component comprises a diol having polyethylene oxide side chain segments; a diol having main chain segments selected from the group consisting of polyethylene oxide, polypropylene oxide, and combinations thereof; a triol having main chain segments selected from the group consisting of polyethylene oxide, polypropylene oxide, and combinations thereof; an alkyl diol; an alkyl triol; a polycarbonate diol; a polycarbonate triol; or combinations thereof.

5. The composition of claim 1, wherein the dihydroxy-carboxylic acid is selected from the group of compounds having the formula $(OH)_2R^4(COOH)$, wherein $R^4$ is an unbranched or branched alkyl group having from about 1 to about 12 carbon atoms.

6. The composition of claim 1, wherein the carboxylic-reactive amphoteric surfactant is selected from the group consisting of:
    (a) an amine oxide having the formula $R_3^5-N^+-O^-$, wherein $R^5$ is selected from the group consisting of a hydrogen, an unbranched alkyl group having from about 8 to about 18 carbon atoms, and combinations thereof, and wherein at least one $R^5$ is an unbranched alkyl group having from about 8 to about 18 carbon atoms; and (b) an alkyl betaine having the formula $R^6$—$N^+$—$(CH_3)_2$—$CH_2$—$(C=O)$—$O^-$, wherein $R^6$ is an unbranched alkyl group having from about 8 to about 18 carbon atoms.

7. The composition of claim 1, wherein the first polyisocyanate component further comprises a blocked polyisocyanate.

8. The composition of claim 1, wherein the second polyisocyanate component further comprises a polyisocyanate selected from the group consisting of diisocyanates, triisocyanates, derivatives of diisocyanates and triisocyanates capable of forming polyurethane linkages, and combinations thereof.

9. The composition of claim 1, wherein the at least one partially blocked tri-functional polyisocyanate has 1 free isocyanate functional group and 2 blocked isocyanate functional groups.

10. The composition of claim 1, wherein the isocyanate-reactive salt of a surfactant comprises the reaction products of a neutralization reaction between an acid of an anionic surfactant and a base having an isocyanate-reactive functional group.

11. The composition of claim 10, wherein the isocyanate-reactive salt of a surfactant comprises a salt of dimethylaminomethylpropanol and dodecylbenzene sulfonic acid.

12. The composition of claim 1, wherein the isocyanate-reactive cationic surfactant comprises a quaternary ammonium surfactant having 2 hydrophilic isocyanate-reactive functional groups and a hydrophobic hydrocarbon chain having at least about 18 carbon atoms.

13. The composition of claim 12, wherein the 2 hydrophilic isocyanate-reactive functional groups comprise hydroxyethyl functional groups and the hydrophobic hydrocarbon chain comprises stearamide or stearamidopropyl functional groups.

14. The composition of claim 12, wherein the isocyanate-reactive cationic surfactant comprises bis(hydroxyethyl) quaternary ammonium surfactants having stearamide or stearamidopropyl functional groups.

15. The composition of claim 1, wherein the organic solvent comprises a ketone, N-methyl pyrrolidone, acetonitrile, diacetone alcohol, an ester, a glycol ester, a glycol ether, a tertiary alcohol, or combinations thereof.

16. The composition of claim 1, wherein the composition comprises an aqueous polyurethane dispersion, an organic solvent polyurethane solution, or a mixture of an aqueous polyurethane dispersion and an organic solvent polyurethane solution.

17. The composition of claim 1, wherein the first polyurethane, the second polyurethane, or the third polyurethane further comprises the reaction products of a chain extender selected from the group consisting of multi-functional amines, multi-functional polyols, urea, and combinations thereof.

18. The composition of claim 1, wherein the first polyurethane, the second polyurethane, or the third polyurethane comprises a prepolymer.

19. The composition of claim 1 comprising the first mixture,
wherein the dihydroxy-carboxylic acid is selected from the group of compounds having the formula $(OH)_2R^4(COOH)$, wherein $R^4$ is an unbranched or branched alkyl group having from about 1 to about 12 carbon atoms; and
wherein the carboxylic-reactive amphoteric surfactant is selected from the group consisting of an amine oxide and an alkyl betaine.

20. The composition of claim 1 comprising the second mixture,
wherein the at least one partially blocked tri-functional polyisocyanate has 1 free isocyanate functional group and 2 blocked isocyanate functional groups;
wherein the isocyanate-reactive salt of a surfactant comprises the reaction products of a neutralization reaction between an acid of an anionic surfactant and a base having an isocyanate-reactive functional group; and
wherein the isocyanate-reactive cationic surfactant comprises a quaternary ammonium surfactant having 2 hydrophilic isocyanate-reactive functional groups and a hydrophobic hydrocarbon chain having at least about 18 carbon atoms.

21. The composition of claim 1 comprising the third mixture,
wherein the at least one partially blocked tri-functional polyisocyanate has 1 free isocyanate functional group and 2 blocked isocyanate functional groups;
wherein the isocyanate-reactive salt of a surfactant comprises the reaction products of a neutralization reaction between an acid of an anionic surfactant and a base having an isocyanate-reactive functional group; and
wherein the isocyanate-reactive cationic surfactant comprises a quaternary ammonium surfactant having 2 hydrophilic isocyanate-reactive functional groups and a hydrophobic hydrocarbon chain having at least about 18 carbon atoms.

22. The composition of claim 1 further comprising a combination of the first mixture and the second mixture.

23. An article, comprising a substrate and a coating formed on at least one surface of the substrate by curing a coating composition prepared from the coating composition of claim 16.

24. The article of claim 23, wherein the substrate comprises a polycarbonate material, an acrylic material, a polyvinylchloride material, a polybisallyl carbonate material, a polyethylene terephthalate material, a polyethylene naphthenate material, a polyolefin material, a polyurethane material, a polythiourethane material, a fluorinated polymer material, metal, acrylic glass, or glass.

25. A process, comprising applying the coating composition of claim 1 to at least one surface of a substrate and curing the coating composition applied to the at least one surface of the substrate to form a transparent, abrasion-resistant, water-washable anti-fog coating.

* * * * *